(12) United States Patent
Bellamkonda et al.

(10) Patent No.: US 11,442,933 B2
(45) Date of Patent: Sep. 13, 2022

(54) FUNCTION SEMANTIC BASED PARTITION-WISE SQL EXECUTION AND PARTITION PRUNING

(71) Applicant: Oracle International Corporation, Redwood Shores, CA (US)

(72) Inventors: Srikanth Bellamkonda, Mountain View, CA (US); Andrew Witkowski, Foster City, CA (US); Manish Pratap Singh, Cupertino, CA (US); Madhuri Kandepi, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 126 days.

(21) Appl. No.: 15/711,302

(22) Filed: Sep. 21, 2017

(65) Prior Publication Data
US 2019/0087457 A1 Mar. 21, 2019

(51) Int. Cl.
*G06F 16/242* (2019.01)
*G06F 16/2455* (2019.01)

(52) U.S. Cl.
CPC .... *G06F 16/2443* (2019.01); *G06F 16/24553* (2019.01)

(58) Field of Classification Search
CPC .................. G06F 16/2443; G06F 16/24553
See application file for complete search history.

(56) References Cited

U.S. PATENT DOCUMENTS

| 7,970,756 B2 * | 6/2011 | Beavin ............. G06F 16/24537 707/718 |
| 2006/0182046 A1 * | 8/2006 | Dageville ............ G06F 9/4494 370/260 |
| 2008/0215544 A1 * | 9/2008 | Galindo-Legaria ....................... G06F 16/2452 |
| 2012/0310916 A1 * | 12/2012 | Abadi ................. G06F 16/2456 707/713 |

OTHER PUBLICATIONS

Sun, L. et al., "Fine-grained Partitioning for Aggressive Data Skipping", SIGMOD '14: Proceedings of the 2014 ACM SIGMOD International Conference on Management of Data, (Jun. 2014).

(Continued)

*Primary Examiner* — Anhtai V Tran
*Assistant Examiner* — Xiaoqin Hu
(74) *Attorney, Agent, or Firm* — Vista IP Law Group, LLP

(57) ABSTRACT

An approach for implementing function semantic based partition-wise SQL execution and partition pruning in a data processing system is provided. The system receives a query directed to a range-partitioned table and determines if operation key(s) of the query include(s) function(s) over the table partitioning key(s). If so, the system obtains a set of values corresponding to each partition by evaluating the function(s) on a low bound and/or a high bound table partitioning key value corresponding to the partition. The system may then compare the sets of values corresponding to different partitions and determine whether to aggregate results obtained by executing the query over the partitions based on the comparison. The system may also determine whether to prune (Continued)

any partitions from processing based on a set of correlations between the set of values for each partition and predicate(s) of the query including function(s) over the table partitioning key(s).

46 Claims, 39 Drawing Sheets

(56) References Cited

OTHER PUBLICATIONS

MYSQL, "Guide to MySQL 5.1 Partitioning", (Oct. 26, 2006).
Herodotou, H. et al., "Query Optimization Techniques for Partitioned Tables", SIGMOD '11: Proceedings of the 2011 ACM SIGMOD International Conference on Management of data, (Jun. 2011).
Zamanian, E. et al., "Locality-aware Partitioning in Parallel Database Systems", SIGMOD '15: Proceedings of the 2015 ACM SIGMOD International Conference on Management of Data, (May 2015).
Baer, H., "Partitioning in Oracle Database 11g", White Paper, (Jun. 2007).
Zhou, J. et al., "Advanced Partitioning Techniques for Massively Distributed Computation", SIGMOD '12: Proceedings of the 2012 ACM SIGMOD International Conference on Management of Data, (May 2012).
Bar, H., "Partitioning with Oracle Database 12c", White Paper, (Jun. 2013).
Belden, E. et al., "Oracle Database VLDB and Partitioning Guide, 12c Release 2 (12.2)", (Jul. 2017).
Xie, D., "Simba: Spatial In-Memory Big Data Analysis", SIGSPACIAL '16: Proceedings of the 24th ACM SIGSPATIAL International Conference on Advances in Geographic Information Systems, (Oct. 2016).
Chen, W. et al., "Database Partitioning, Table Partitioning, and MDC for DB2 9", IBM Redbooks, (Aug. 2007).
Vo, H., "SATO: A Spatial Data Partitioning Framework for Scalable Query Processing", SIGSPATIAL '14: Proceedings of the 22nd ACM SIGSPATIAL International Conference on Advances in Geographic Information Systems, (Nov. 2014).
MYSQL, "22.4 Partition Pruning", MySQL 5.7 Reference Manual, (Jun. 30, 2017). (Publication date based on indicated capture date by Archive.org; first publication date unknown).

* cited by examiner

FIG. 4B

Operation key : MONTH(time_id)
Partitioning : Range-partitioned over time_id. Each partition corresponds to a month

| Partition Name | Range partition definition | Low Bound | High Bound | Low Value: MONTH(Low Bound) | High Value: MONTH(High Bound) |
|---|---|---|---|---|---|
| P1 | VALUES LESS THAN 01-FEB-2017 | Undefined | 31-JAN-2017 | Undefined | JAN |
| P2 | VALUES LESS THAN 01-MAR-2017 | 01-FEB-2017 | 28-FEB-2017 | FEB | FEB |
| P3 | VALUES LESS THAN 01-APR-2017 | 01-MAR-2017 | 31-MAR-2017 | MAR | MAR |
| P4 | VALUES LESS THAN 01-MAY-2017 | 01-APR-2017 | 30-APR-2017 | APR | APR |
| P5 | VALUES LESS THAN 01-JUN-2017 | 01-MAY-2017 | 31-MAY-2017 | MAY | MAY |
| P6 | VALUES LESS THAN 01-JUL-2017 | 01-JUN-2017 | 30-JUN-2017 | JUN | JUN |
| P7 | VALUES LESS THAN 01-AUG-2017 | 01-JUL-2017 | 31-JUL-2017 | JUL | JUL |
| P8 | VALUES LESS THAN 01-SEP-2017 | 01-AUG-2017 | 31-AUG-2017 | AUG | AUG |
| P9 | VALUES LESS THAN 01-OCT-2017 | 01-SEP-2017 | 30-SEP-2017 | SEP | SEP |
| P10 | VALUES LESS THAN 01-NOV-2017 | 01-OCT-2017 | 31-OCT-2017 | OCT | OCT |
| P11 | VALUES LESS THAN 01-DEC-2017 | 01-NOV-2017 | 30-NOV-2017 | NOV | NOV |
| P12 | VALUES LESS THAN 01-JAN-2018 | 01-DEC-2017 | 31-DEC-2017 | DEC | DEC |

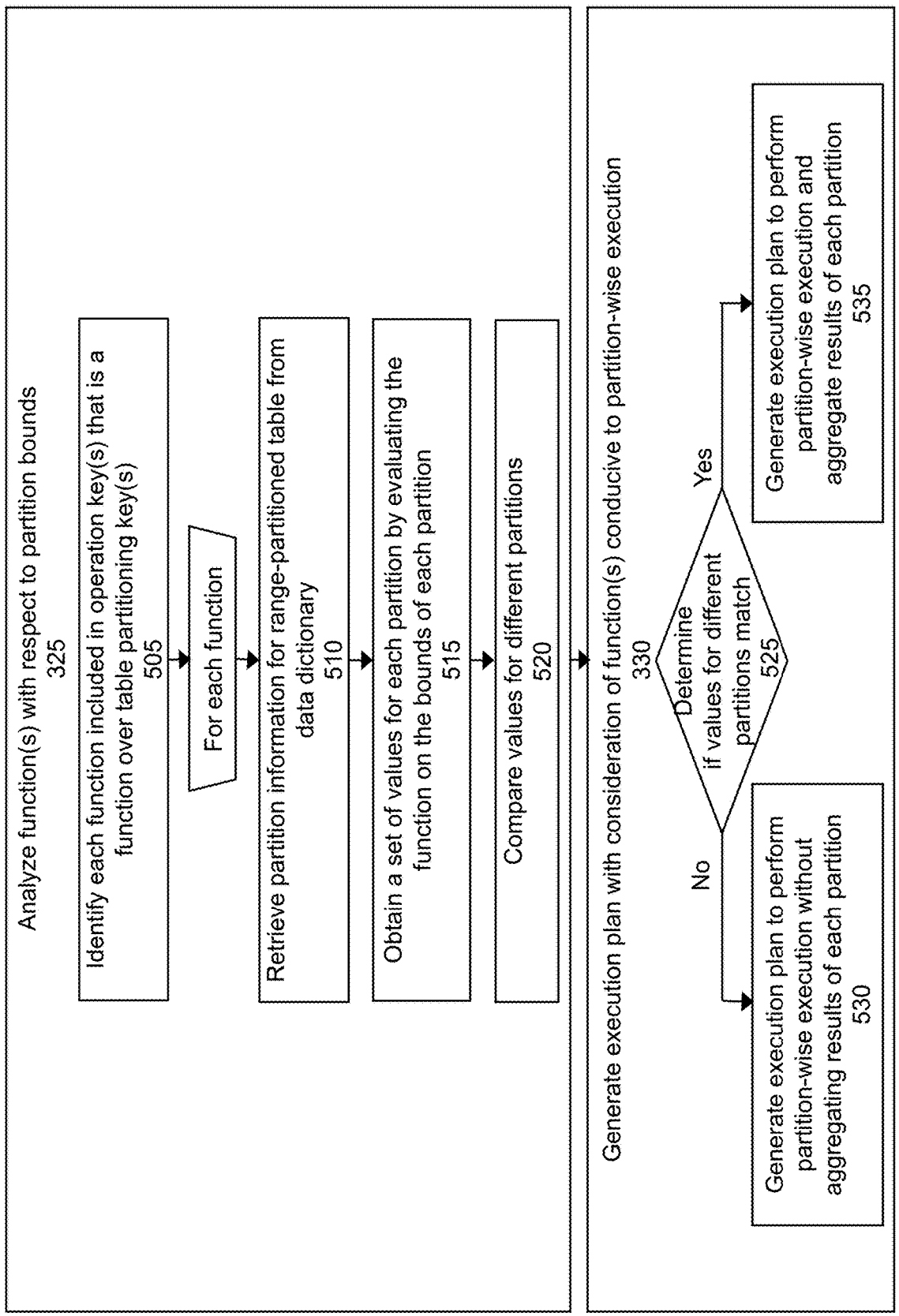

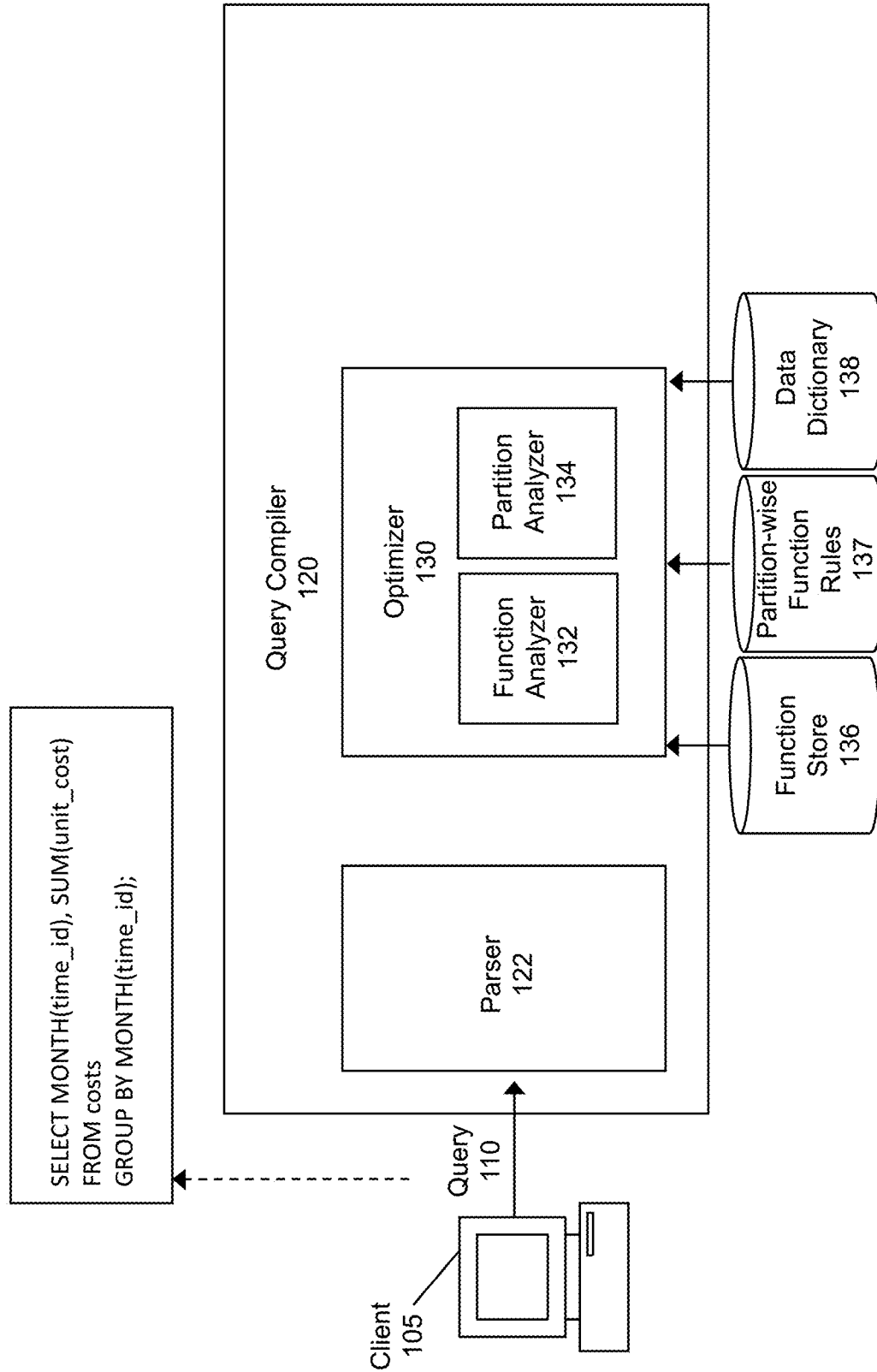

FIG. 6D

Operation key : MONTH(time_id)
Partitioning : Range-partitioned over time_id. Each partition corresponds to three months

| Partition Name | Range partition definition | Low Bound | High Bound | Low Value: MONTH(Low Bound) | High Value: MONTH(High Bound) |
|---|---|---|---|---|---|
| Q1 | VALUES LESS THAN 01-APR-2017 | Undefined | 31-MAR-2017 | Undefined | MAR |
| Q2 | VALUES LESS THAN 01-JUL-2017 | 01-APR-2017 | 30-JUN-2017 | APR | JUN |
| Q3 | VALUES LESS THAN 01-OCT-2017 | 01-JUL-2017 | 30-SEP-2017 | JUL | SEP |
| Q4 | VALUES LESS THAN 01-JAN-2018 | 01-OCT-2017 | 31-DEC-2017 | OCT | DEC |

FIG. 7D

Operation key : YEAR(time_id)
Partitioning : Range-partitioned over time_id. Each partition corresponds to three months

| Partition Name | Range partition definition | Low Bound | High Bound | Low Value: YEAR(Low Bound) | High Value: YEAR(High Bound) |
|---|---|---|---|---|---|
| Q1 | VALUES LESS THAN 01-APR-2017 | Undefined | 31-MAR-2017 | Undefined | 2017 |
| Q2 | VALUES LESS THAN 01-JUL-2017 | 01-APR-2017 | 30-JUN-2017 | 2017 | 2017 |
| Q3 | VALUES LESS THAN 01-OCT-2017 | 01-JUL-2017 | 30-SEP-2017 | 2017 | 2017 |
| Q4 | VALUES LESS THAN 01-JAN-2018 | 01-OCT-2017 | 31-DEC-2017 | 2017 | 2017 |
| ... | ... | ... | ... | ... | ... |

FIG. 11A

Operation key: MONTH(time_id)
Window function: OVER (partition by MONTH(time_id))
Partitioning : Range-partitioned over time_id. Each partition corresponds to a month

| Partition Name | Range partition definition | Low Bound | High Bound | Low Value: MONTH(Low Bound) | High Value: MONTH(High Bound) |
|---|---|---|---|---|---|
| P1 | VALUES LESS THAN 01-FEB-2017 | Undefined | 31-JAN-2017 | Undefined | JAN |
| P2 | VALUES LESS THAN 01-MAR-2017 | 01-FEB-2017 | 28-FEB-2017 | FEB | FEB |
| P3 | VALUES LESS THAN 01-APR-2017 | 01-MAR-2017 | 31-MAR-2017 | MAR | MAR |
| P4 | VALUES LESS THAN 01-MAY-2017 | 01-APR-2017 | 30-APR-2017 | APR | APR |
| P5 | VALUES LESS THAN 01-JUN-2017 | 01-MAY-2017 | 31-MAY-2017 | MAY | MAY |
| P6 | VALUES LESS THAN 01-JUL-2017 | 01-JUN-2017 | 30-JUN-2017 | JUN | JUN |
| P7 | VALUES LESS THAN 01-AUG-2017 | 01-JUL-2017 | 31-JUL-2017 | JUL | JUL |
| P8 | VALUES LESS THAN 01-SEP-2017 | 01-AUG-2017 | 31-AUG-2017 | AUG | AUG |
| P9 | VALUES LESS THAN 01-OCT-2017 | 01-SEP-2017 | 30-SEP-2017 | SEP | SEP |
| P10 | VALUES LESS THAN 01-NOV-2017 | 01-OCT-2017 | 31-OCT-2017 | OCT | OCT |
| P11 | VALUES LESS THAN 01-DEC-2017 | 01-NOV-2017 | 30-NOV-2017 | NOV | NOV |
| P12 | VALUES LESS THAN 01-JAN-2018 | 01-DEC-2017 | 31-DEC-2017 | DEC | DEC |

Outcome : Perform partition-wise execution without aggregating results of each partition

FIG. 11B

Operation key : TRUNC (time_id, 'MONTH')
Partitioning : Range-partitioned over time_id. Each partition corresponds to 6 months or 1 month

| Partition Name | Range partition definition | Low Bound | High Bound | Low Value: TRUNC(Low Bound) | High Value: TRUNC(High Bound) |
|---|---|---|---|---|---|
| S1 | VALUES LESS THAN 01-JUL-2016 | Undefined | 30-JUN-2016 | Undefined | 01-JUN-2016 |
| S2 | VALUES LESS THAN 01-JAN-2017 | 01-JUL-2016 | 31-DEC-2016 | 01-JUL-2016 | 01-DEC-2016 |
| P1 | VALUES LESS THAN 01-FEB-2017 | 01-JAN-2017 | 31-JAN-2017 | 01-JAN-2017 | 01-JAN-2017 |
| P2 | VALUES LESS THAN 01-MAR-2017 | 01-FEB-2017 | 28-FEB-2017 | 01-FEB-2017 | 01-FEB-2017 |
| P3 | VALUES LESS THAN 01-APR-2017 | 01-MAR-2017 | 31-MAR-2017 | 01-MAR-2017 | 01-MAR-2017 |
| P4 | VALUES LESS THAN 01-MAY-2017 | 01-APR-2017 | 30-APR-2017 | 01-APR-2017 | 01-APR-2017 |
| P5 | VALUES LESS THAN 01-JUN-2017 | 01-MAY-2017 | 31-MAY-2017 | 01-MAY-2017 | 01-MAY-2017 |
| P6 | VALUES LESS THAN 01-JUL-2017 | 01-JUN-2017 | 30-JUN-2017 | 01-JUN-2017 | 01-JUN-2017 |
| ... | ... | ... | ... | ... | ... |

Outcome : Perform partition-wise execution without aggregating results of each partition

FIG. 11C

Operation key : MONTH (time_id)
Partitioning : Range-partitioned over time_id. Each partition corresponds to 6 months or 1 month

| Partition Name | Range partition definition | Low Bound | High Bound | Low Value: MONTH(Low Bound) | High Value: MONTH(High Bound) |
|---|---|---|---|---|---|
| S1 | VALUES LESS THAN 01-JUL-2016 | Undefined | 30-JUN-2016 | Undefined | JUN |
| S2 | VALUES LESS THAN 01-JAN-2017 | 01-JUL-2016 | 31-DEC-2016 | JUL | DEC |
| P1 | VALUES LESS THAN 01-FEB-2017 | 01-JAN-2017 | 31-JAN-2017 | JAN | JAN |
| P2 | VALUES LESS THAN 01-MAR-2017 | 01-FEB-2017 | 28-FEB-2017 | FEB | FEB |
| P3 | VALUES LESS THAN 01-APR-2017 | 01-MAR-2017 | 31-MAR-2017 | MAR | MAR |
| P4 | VALUES LESS THAN 01-MAY-2017 | 01-APR-2017 | 30-APR-2017 | APR | APR |
| P5 | VALUES LESS THAN 01-JUN-2017 | 01-MAY-2017 | 31-MAY-2017 | MAY | MAY |
| P6 | VALUES LESS THAN 01-JUL-2017 | 01-JUN-2017 | 30-JUN-2017 | JUN | JUN |
| ... | ... | ... | ... | ... | ... |

Outcome : Perform partition-wise execution and aggregate results of each partition

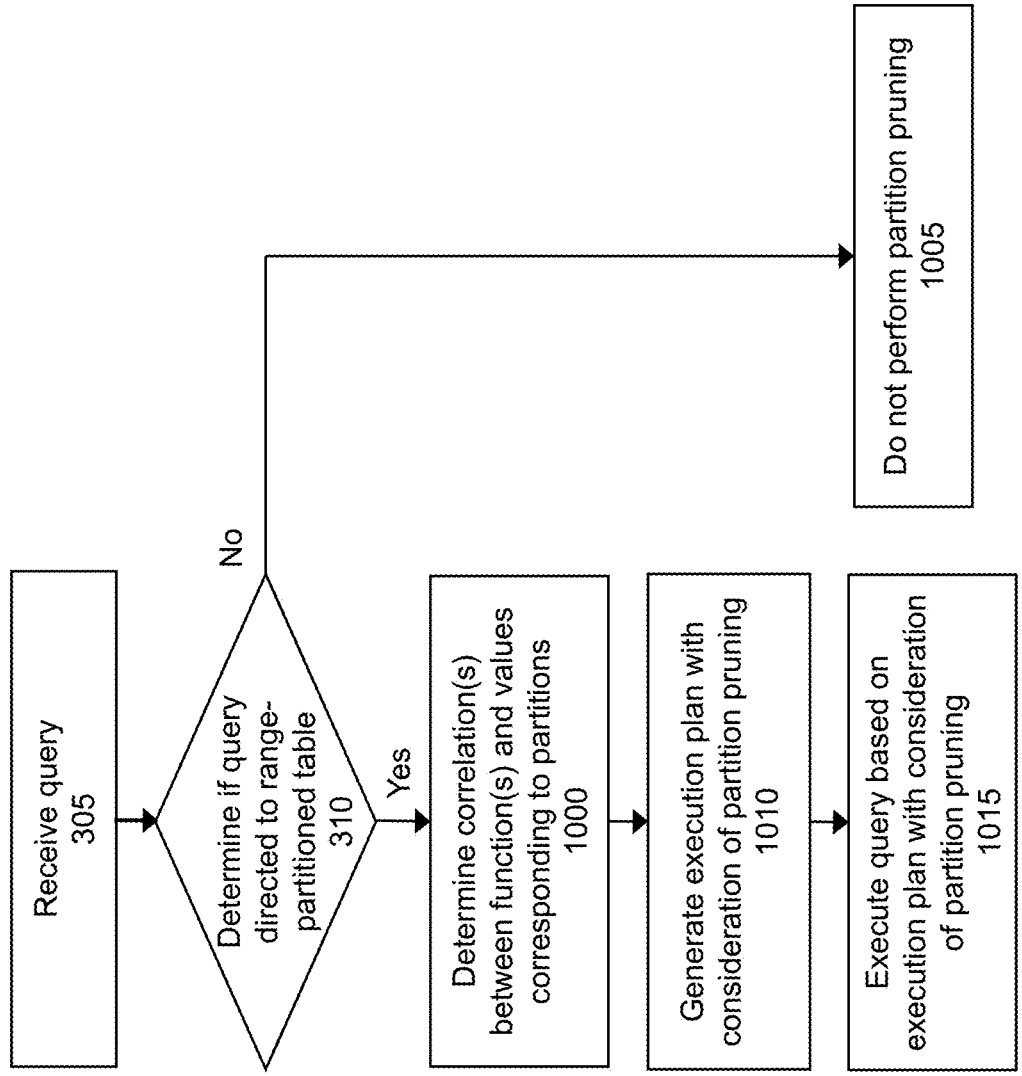

FIG. 13D

Predicate : MONTH(time_id) = 'MAR'
Partitioning : Range-partitioned over time_id. Each partition corresponds to three months

| Partition Name | Range partition definition | Low Bound | High Bound | Low Value: MONTH(Low Bound) | High Value: MONTH(High Bound) |
|---|---|---|---|---|---|
| Q1 | VALUES LESS THAN 01-APR-2017 | Undefined | 31-MAR-2017 | Undefined | MAR |
| Q2 | VALUES LESS THAN 01-JUL-2017 | 01-APR-2017 | 30-JUN-2017 | APR | JUN |
| Q3 | VALUES LESS THAN 01-OCT-2017 | 01-JUL-2017 | 30-SEP-2017 | JUL | SEP |
| Q4 | VALUES LESS THAN 01-JAN-2018 | 01-OCT-2017 | 31-DEC-2017 | OCT | DEC |

FIG. 14A

| prod_id | unit_cost | time_id |
|---|---|---|
| RZ-098-234 | $8.55 | 04-JAN-2017 |
| RZ-038-243 | $29.85 | 29-JAN-2017 |
| CX-023-968 | $12.49 | 09-FEB-2017 |
| TM-012-461 | $3.65 | 14-MAR-2017 |

Q1 partition

| prod_id | unit_cost | time_id |
|---|---|---|
| CX-014-7~~ | $15.95 | 2~-APR-2017 |
| RZ-032-255 | $9.~~ | 26-APR-2017 |
| QX-064-2~~ | $8.25 | 0~-MAY-2017 |
| RZ-023-098 | $23.75 | 30-JUN-2~~7 |

Q2 partition

| prod_id | unit_cost | time_id |
|---|---|---|
| TM-013-4~5 | $28.85 | 1~-JUL-2017 |
| RZ-012-874 | $4.~~ | 20-JUL-2017 |
| KL-023-26~ | $5.95 | 0~-AUG-2017 |
| RZ-108-229 | $15.99 | 07-SEP-2~~7 |

Q3 partition

| prod_id | unit_cost | time_id |
|---|---|---|
| RZ-002-288 | $8.05 | 06-OCT-2017 |
| CX-042-657 | $8.55 | ~7-NOV-2017 |
| RZ-~68-126 | $12.55 | 04-DEC-2~~7 |

Q4 partition

FUNCTION SEMANTIC BASED PARTITION-WISE SQL EXECUTION AND PARTITION PRUNING

FIELD

This disclosure concerns a method, a computer program product, and a computer system for implementing function semantic based partition-wise SQL execution and partition pruning in a data processing system.

BACKGROUND

Data processing systems, such as database management systems (DBMSs) and relational database management systems (RDBMSs), allow applications running on clients (e.g., workstations, personal computers, or remote computing terminals) to access data stored in databases located at one or more database servers. Database servers may be interconnected by a network. This network may also connect one or more clients to the database servers, allowing the clients to submit queries and requests to perform operations on the data stored at the database servers via the network.

Tables stored in databases may be divided or "partitioned" into smaller parts or "partitions." Tables may be partitioned according to various partitioning strategies, such as range partitioning, hash partitioning, and list partitioning. For a given table, each row (i.e., the set of fields within the table that are relevant to a specific entity) may be assigned to a single partition based on a table partitioning key, which corresponds to one or more columns that are used to determine the partition to which each row will be assigned. For example, a table with a date column may be range-partitioned, in which the date column is used as the table partitioning key and rows of the table are mapped to different partitions based on ranges of values of the table partitioning key that are established for each partition. In this example, rows in the table with values in the date column corresponding to the table partitioning key or "table partitioning key values" from 1 Jan. 2015 to 31 Jan. 2015 may be assigned to a January-2015 partition, while rows in the table with table partitioning key values from 1 Feb. 2015 to 28 Feb. 2015 may be assigned to a February-2015 partition, etc.

For tables that are range-partitioned, each partition may be associated with a range partition definition that defines a range of table partitioning key values associated with the partition. A range partition definition may correspond to a VALUES LESS THAN clause that specifies a non-inclusive high bound, such that any rows having table partitioning key values that are less than the high bound (e.g., date values earlier than the high bound date) are included in the partition and any rows having table partitioning key values that are equal to or greater than the high bound (e.g., date values on or later than the high bound date) are included in a different partition. In the above examples, the January-2015 partition may be associated with a VALUES LESS THAN 1 Feb. 2015 clause, the February-2015 partition may be associated with a VALUES LESS THAN 1 Mar. 2015 clause, etc.

Partitioning large tables provides several advantages, including improved query performance. Executing a query directed to a partitioned table in a partition-wise manner (i.e., on a partition-by-partition basis) may be faster than executing the same query directed to the table absent partitioning since partition-wise execution limits the amount of data to be examined or operated on, allowing for query performance to be improved via parallel execution and/or partition pruning. For example, to execute a query directed to a partitioned table, a query coordinator process may assign different partitions of a table to each of multiple slave processes. In this example, the slave processes may execute the query in parallel over the partitions to which they are assigned and return the results back to the query coordinator process, which coordinates the results and sends them back to a client from which the query originated. Partition pruning may also improve query performance for queries directed to partitioned tables by removing or "pruning" unneeded partitions (e.g., partitions containing date ranges that are irrelevant to a query) from processing, which further reduces the amount of data required to be examined or operated on. For example, if a table that includes data recorded over a time span of two years is partitioned by week (giving a total of 104 partitions), only a single partition must be accessed to execute a query requesting information for a particular week. In this example, rather than executing the query over all 104 partitions, the query may execute 100 times faster by pruning away the 103 unneeded partitions from processing.

Additional advantages of partitioning large tables include enhanced manageability and availability of large amounts of data. For example, rather than performing maintenance operations on a large table, by partitioning the table, database administrators may perform maintenance operations on each partition, which is often a more manageable chunk of data with which to work. In this example, by performing the maintenance operations in small batch windows, scheduled downtime may be reduced, enhancing data availability. Furthermore, partitioning may also enhance data availability in situations in which different partitions of a table are stored in separate tablespaces on different storage tiers. In such situations, if one partition becomes unavailable, the other partitions may remain available, allowing queries to continue to be processed over these partitions.

Conventionally, data processing systems only allow queries directed to data stored in partitioned tables to be executed in a partition-wise manner in specific situations. These situations include those in which the queries aggregate values by one or more columns, such as queries that include a GROUP BY clause, in which the operation keys of the query (e.g., the columns specified by a GROUP BY clause) and the table partitioning keys are an exact match. These situations also include those in which the operation keys of the queries are a superset of the table partitioning keys. For example, suppose a table called "cost_part" is created, which includes three columns called "date," "cost," and "id" and stores data spanning a particular year. In this example, suppose also that the table is range-partitioned according to a table partitioning key corresponding to the date column, such that each partition corresponds to a month. Continuing with this example, the following query is subsequently received at a data processing system:

SELECT date, SUM(cost) FROM cost_part GROUP BY date;

In this example, in which a GROUP BY operation is being performed, since the operation key ("date") matches the table partitioning key, the query may be executed in a partition-wise manner. In the above example, suppose the following query is also received at the data processing system:

SELECT date, id, SUM(cost) FROM cost_part GROUP BY date, id;

In this example, since the operation key ("date, id") is a superset of the table partitioning key, this query may also be executed in a partition-wise manner.

However, conventional data processing systems do not support the execution of queries directed to data stored in partitioned tables in a partition-wise manner if the table partitioning keys and the operation keys are not an exact match or if the operation keys are not a superset of the table partitioning keys. For example, suppose there is a function called "MONTH," which extracts the month from a date and that the following query is received at a data processing system, which is requesting data from the table in the above example:

SELECT MONTH(date), SUM(cost) FROM cost_part
   GROUP BY MONTH(date);

In this example, since the table partitioning key, which corresponds to the date column, and the operation key, which corresponds to a function over the table partitioning key (i.e., MONTH(date)), do not match and the operation key is not a superset of the table partitioning key, the query will not be executed in a partition-wise manner. Instead, the query in this example will be executed over all the data in the table, which is less efficient than executing the query in a partition-wise manner for the reasons described above. This is true even though execution of the GROUP BY operation in a partition-wise manner is feasible and will produce the correct results since the MONTH function preserves the partition mapping of rows of the partitioned table.

Therefore, to leverage the benefits of partition-wise execution of queries, there is a need for an improved approach to identify situations in which partition-wise execution of queries directed to partitioned tables is feasible and to execute such queries in a partition-wise manner.

SUMMARY

Embodiments of the present invention provide a method, a computer program product, and a computer system for implementing function semantic based partition-wise SQL execution and partition pruning in a data processing system.

According to some embodiments, a data processing system is implemented to perform operations on partitioned tables. The data processing system may receive a query originating from a client requesting to perform an operation directed to a range-partitioned table stored in a database at a database server. The data processing system may then determine if the operation key(s) of the query include(s) one or more functions over the table partitioning key(s). If so, the data processing system may obtain a set of values corresponding to each partition by evaluating the function(s) on a low bound table partitioning key value and/or a high bound table partitioning key value corresponding to the partition. The data processing system may then compare the set of values corresponding to different partitions and determine whether to aggregate a set of results obtained by executing the query on a subset of the partitions based on the comparison. In some embodiments, the data processing system may also determine whether to prune one or more partitions from processing based on a set of correlations between the set of values corresponding to each partition and predicate(s) of the query including function(s) over the table partitioning key(s). The data processing system may then execute the query accordingly.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIGS. 4A-4C illustrate an example of generating an execution plan with consideration of one or more functions conducive to partition-wise execution according to some embodiments of the invention.

FIG. 5 is a flowchart for analyzing one or more functions with respect to table partition bounds of a partitioned table and generating an execution plan with consideration of functions conducive to partition-wise execution according to some embodiments of the invention.

FIGS. 6A-6E illustrate an example of generating an execution plan to execute a query in a partition-wise manner without aggregating results of each partition based on semantics of a function of the query according to some embodiments of the invention.

FIGS. 7A-7E illustrate an example of generating an execution plan to execute a query in a partition-wise manner and to aggregate results of each partition based on semantics of a function of the query according to some embodiments of the invention.

FIG. 11A is an example table used to generate an execution plan to execute a query in a partition-wise manner without aggregating results of each partition according to some embodiments of the invention.

FIG. 11B is an additional example table used to generate an execution plan to execute a query in a partition-wise manner without aggregating results of each partition according to some embodiments of the invention.

FIG. 11C is an example table used to generate an execution plan to execute a query in a partition-wise manner and to aggregate results of each partition based on semantics of a function of the query according to some embodiments of the invention.

FIG. 12 is a flow chart for determining whether to execute a query in a data processing system with consideration of partition pruning according to some embodiments of the invention.

FIGS. 13A-13E illustrate an example of generating an execution plan to execute a query with consideration of partition pruning according to some embodiments of the invention.

FIG. 14A illustrates an example of pruning partitions of a partitioned table according to some embodiments of the invention.

DETAILED DESCRIPTION OF THE EMBODIMENTS OF THE INVENTION

The present disclosure provides an approach for implementing function semantic based partition-wise SQL execution and partition pruning in a data processing system.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

This disclosure will now discuss an improved approach for implementing function semantic based partition-wise SQL execution in a data processing system, a data processing system receives a query directed to a range-partitioned table. If the data processing system determines that the operation key(s) of the query include(s) one or more functions over the table partitioning key(s), the data processing system obtains a set of values corresponding to each partition by evaluating the function(s) on the bounds of the partition. The data processing system then compares the set of values corresponding to different partitions and determines whether to aggregate a set of results obtained by executing the query on a subset of the partitions based on the comparison.

Figure 1:
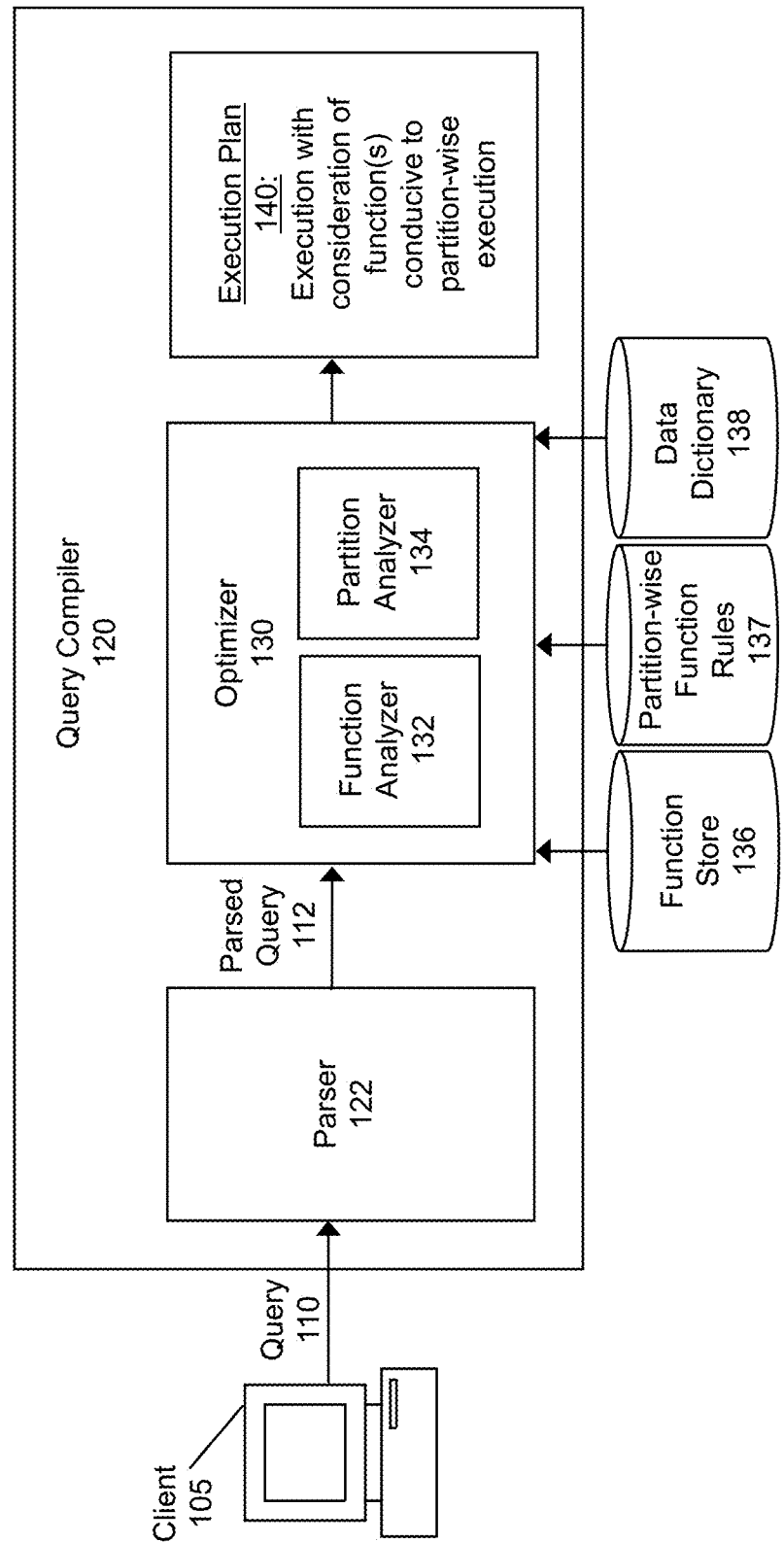
FIG. 1 illustrates components of a data processing system used to compile a query originating from a client according to some embodiments of the invention.

FIG. 1 illustrates components of a data processing system used to compile a query originating from a client according to some embodiments of the invention. In various embodiments, some aspects of the embodiments may be implemented separately or as a whole. For illustrative purposes, FIG. 1 shows a client 105 that communicates a query 110 that is received at a query compiler 120 of the data processing system. However, in various embodiments, the client 105, as well as additional clients 105, may communicate additional queries 110 to the query compiler 120 that are not depicted in FIG. 1. Furthermore, conventional components of data processing systems and clients 105, such as API layers, and the like are not shown so as to not obscure the components of the data processing system to be discussed with regard to FIG. 1.

As illustrated in FIG. 1, the data processing system includes a query compiler 120 that receives a query 110 (e.g., an SQL statement) originating from a client 105. In some embodiments, the query 110 is a request to perform an operation on data stored in one or more databases at one or more database servers. For example, the query 110 may be a request to access or to manipulate data stored in a table at a database server. Upon receiving the query 110, the query compiler 120 may generate an execution plan 140 with consideration of one or more functions included in the query 110 that are conducive to partition-wise execution. In some embodiments, components of the query compiler 120 include a parser 122 and an optimizer 130. The components of the query compiler 120 perform various steps in a compilation process to generate the execution plan 140 based on the query 110 originating from the client 105.

The parser 122 may perform various checks on the query 110 originating from the client 105. In some embodiments, the parser 122 may check the query 110 for syntactic validity. For example, suppose the query compiler 120 receives the following query 110 from the client 105:

SELECT time_id, SUM(unit_cost) FORM costs GROUP BY time_id;

In this example, the parser 122 identifies an error when checking the query 110 for syntactic validity since the keyword "FROM" is misspelled as "FORM." The compilation process may stop upon identifying the misspelling and an error indicating this misspelling may be returned to the client 105. The parser 122 may also perform a semantic check. For example, suppose the query compiler 120 receives the following query 110 from the client 105:

SELECT time_id, SUM(unit_cost) FROM costs GROUP BY time_id;

In this example, if a table named "costs" does not exist, the parser 122 may determine that the table does not exist, stop the compilation process, and return an error to the client 105 indicating that the table does not exist. The parser 122 may also check whether a version of the execution plan 140 for the query 110 already exists so that steps of processing that are resource-intensive (e.g., steps performed by the optimizer 130) may be skipped. For example, when the query compiler 120 receives a query 110, the parser 122 may search for an existing execution plan 140 that corresponds to the query 110 (e.g., in a shared buffer cache that is shared by all database server and background processes for one database instance). If a corresponding execution plan 140 exists, the query compiler 120 may reuse the execution plan 140; otherwise, the query compiler 120 must generate a new execution plan 140. Once the parser 122 has completed performing checks on the query 110, the parser 122 may pass the parsed query 112 to the optimizer 130. In some embodiments, the parser 122 may also store the parsed query 112 (e.g., in the shared buffer cache described above).

The parsed query 112 that is received at the optimizer 130 may include one or more query blocks. Each query block in the parsed query 112 may be identified by a keyword (e.g., SELECT, INSERT, UPDATE, DELETE, or MERGE), which signals the beginning of a query block. For example, suppose the following query 110 is received from the client 105:

SELECT name FROM dept IN (SELECT dept FROM hr.dept WHERE location_id=1600);

The query 110 in this example includes two query blocks that each begin with the "SELECT" keyword—an inner query block (in parentheses) and an outer query block (the remainder of the query 110).

The parsed query 112 that is received at the optimizer 130 may also include one or more functions, which may be identified by a function analyzer 132 of the optimizer 130. The function analyzer 132 may identify functions based on information stored in a function store 136. The function store 136 stores information describing various functions (e.g., built-in SQL functions and user-defined functions written in PL/SQL). For example, suppose the query compiler 120 receives the following query 110:

SELECT time_id, SUM(unit_cost) FROM costs GROUP BY time_id;

In this example, once the optimizer 130 receives the parsed query 112, the function analyzer 132 may access the function store 136 and identify the SUM function as a built-in SQL function. As an additional example, suppose the data processing system receives the following query 110:

SELECT MONTH(time_id), SUM(unit_cost) FROM costs GROUP BY MONTH(time_id);

In this example, once the optimizer 130 receives the parsed query 112, the function analyzer 132 may access the function store 136 and identify the SUM function as a built-in SQL function and the MONTH function as a user-defined function. Alternatively, in this example, the function analyzer 132 may identify both the SUM function and the MONTH function as built-in SQL functions. As yet another example, suppose the data processing system receives the following query 110:

SELECT EXTRACT(month FROM time_id) "Month", SUM(unit_cost) FROM costs GROUP BY MONTH (time_id);

In this example, once the optimizer 130 receives the parsed query 112, the function analyzer 132 may access the function store 136 and identify the SUM function and the EXTRACT function as a built-in SQL functions.

In some embodiments, based on the semantics of a parsed query 112, the function analyzer 132 may also determine whether any functions are specified over one or more operation keys and whether these functions are functions over the table partitioning key(s). For example, suppose that a table partitioning key for a partitioned table corresponds to a time_id column and that the optimizer 130 receives a parsed query 112 that includes the following GROUP BY clause: "GROUP BY MONTH(time_id);" In this example, the function analyzer 132 may determine that the MONTH function is specified over an operation key and that the MONTH function is a function over the table partitioning key since the GROUP BY operation is to be performed on the MONTH function, the MONTH function is a function over the time_id column, and the time_id column corresponds to the table partitioning key. In the above example, the function analyzer 132 may also determine that the MONTH function is specified over an operation key and that the MONTH function is a function over the table partitioning key if the parsed query 112 includes a window function over the table partitioning key, which divides a result set into partitions (e.g., SUM(unit_cost) OVER(partition by MONTH(time_id))).

In some embodiments, based on the semantics of a parsed query 112, the function analyzer 132 may also determine whether any functions are included in one or more predicate(s) (e.g., syntax specified in a WHERE clause of a SQL statement) and whether these functions are functions over the table partitioning key(s). For example, suppose that a table partitioning key for a partitioned table corresponds to a time_id column and that the optimizer 130 receives a parsed query 112 that includes the following WHERE clause: "WHERE MONTH(time_id)='JAN';" In this example, the function analyzer 132 may determine that the MONTH function is included in a predicate and that the MONTH function is a function over the table partitioning key since the WHERE clause specifies syntax including the MONTH function, the MONTH function is a function over the time_id column, and the time_id column corresponds to the table partitioning key.

The optimizer 130 may access information stored in a data dictionary 138, which provides information about each database controlled by the data processing system (e.g., information including definitions of all schema objects, such as tables, functions, etc.). To provide information about a database controlled by the data processing system, the data processing system may modify information stored in the data dictionary 138 to reflect information received in a statement (e.g., a DDL statement).

Figure 2A:
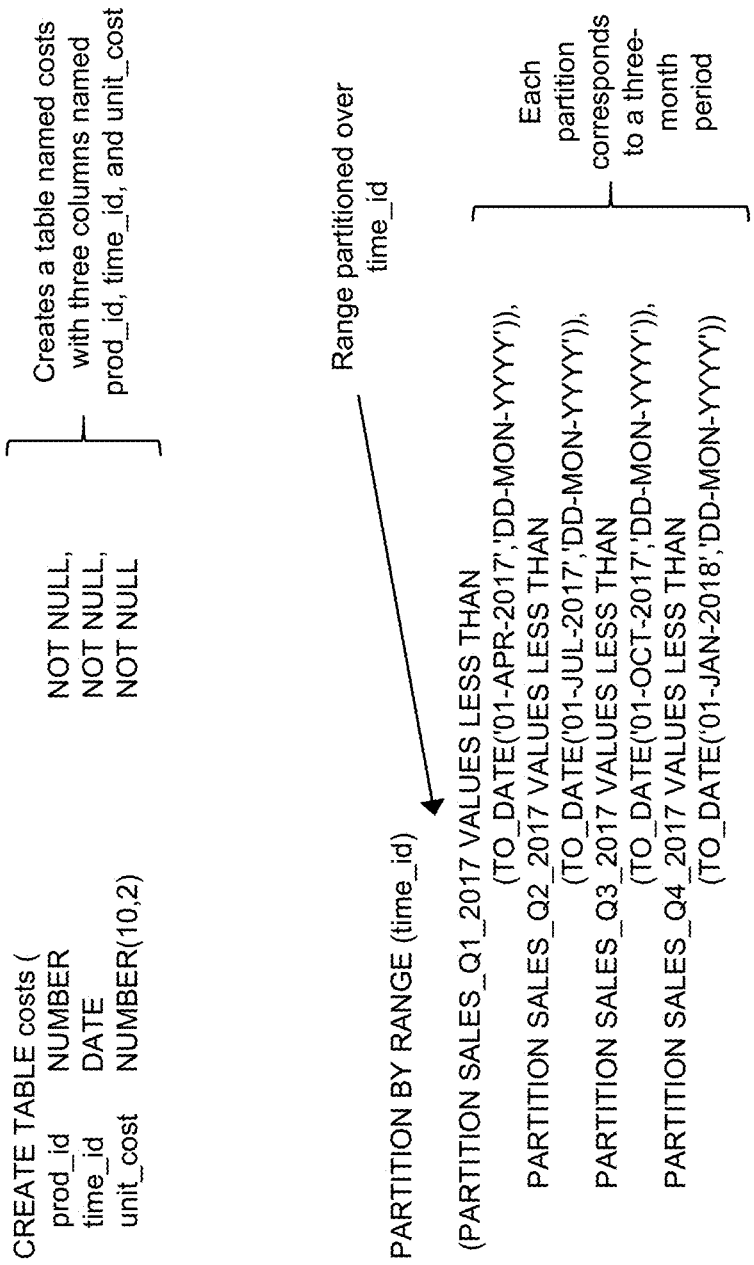
FIG. 2A illustrates an example code listing used to create a range-partitioned table according to some embodiments of the invention.

For example, suppose that the data processing system receives the first portion of the code listing used to create a range-partitioned table illustrated in FIG. 2A, which creates a table named "costs" having columns named "prod_id," "time_id," and "unit_cost." In this example, the data processing system may modify the information stored in the data dictionary 138 upon receiving the request to create the table, as well as upon receiving subsequent requests to populate each row of the table with various types of information. Continuing with this example, suppose that the data processing system subsequently receives the second portion of the code listing illustrated in FIG. 2A, which partitions the costs table by range over a table partitioning key corresponding to the time_id column, such that each partition corresponds to a three-month period.

Figure 2B:
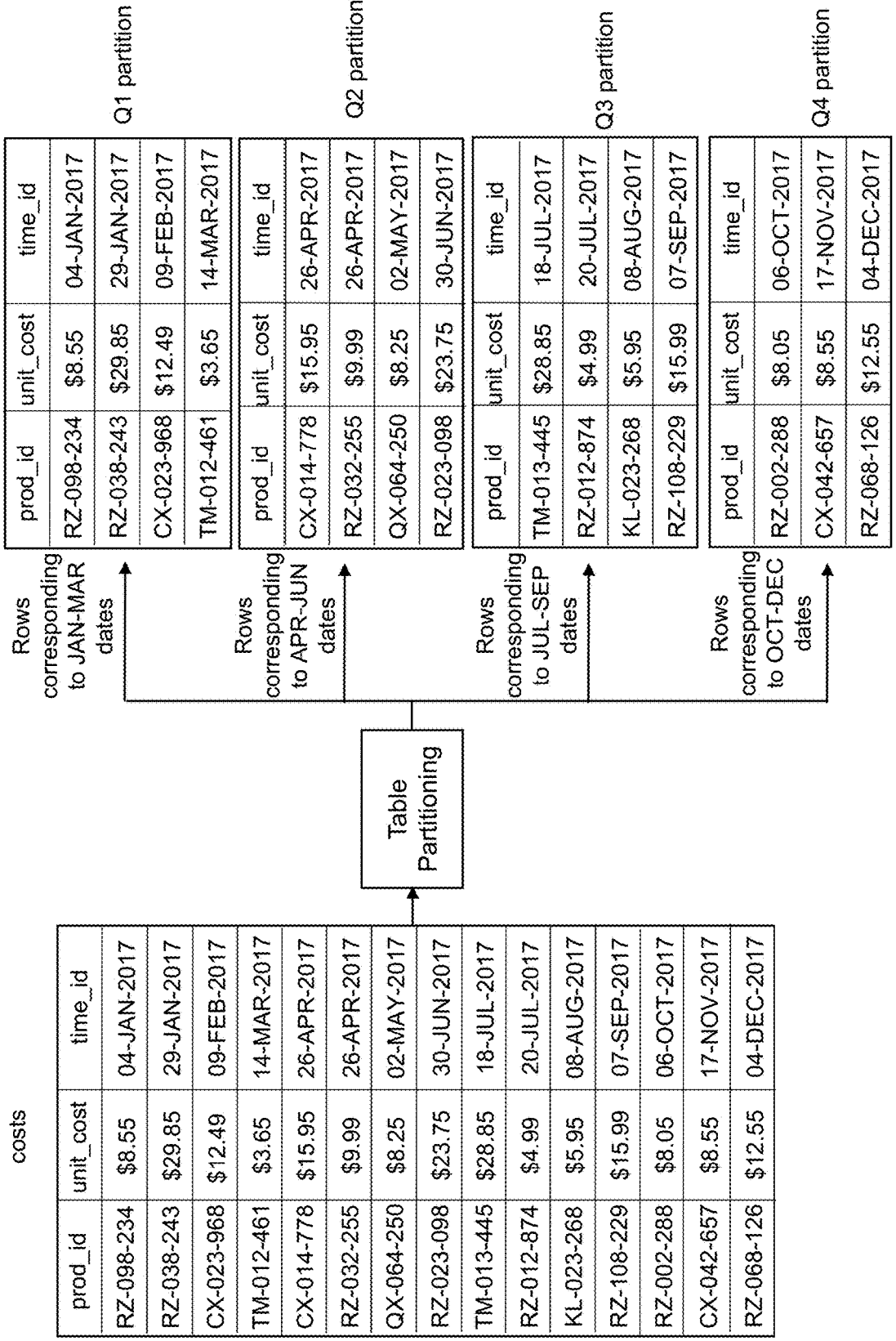
FIG. 2B illustrates an example of a range-partitioned table according to some embodiments of the invention.

The data processing system may also modify the information stored in the data dictionary 138 upon receiving the request to partition the table to reflect these partitions. As shown in FIG. 2B, which illustrates an example of a range-partitioned table, after table partitioning, the costs table is partitioned into four partitions (Q1, Q2, Q3, and Q4), in which rows corresponding to the January through March dates are assigned to the Q1 partition, rows corresponding to the April through June dates are assigned to the Q2 partition, etc., such that each partition corresponds to a three-month period and includes rows having a sequential range of values stored in the time_id column.

Referring back to FIG. 1, the optimizer 130 also includes a partition analyzer 134 that may identify and analyze a partitioned table to which a query 110 is directed. The partition analyzer 134 may do so by accessing information stored in the data dictionary 138, such as information describing a partitioning strategy used to partition the table (e.g., range partitioning, hash partitioning, and list partitioning), information identifying the column(s) of the table corresponding to the table partitioning key(s), information describing a partition definition associated with each partition, etc. For example, suppose the data processing system receives the following query 110:

SELECT time_id, SUM(unit_cost) FROM costs GROUP BY time_id;

In this example, the partition analyzer 134 may access information stored in the data dictionary 138 to determine whether the costs table is a partitioned table.

If the partition analyzer 134 identifies a table to which a query 110 is directed as a partitioned table, it may analyze partitions of the table. For example, the partition analyzer 134 may determine that a table is range-partitioned by date if the table partitioning key corresponds to a date column and a range partition definition associated with each partition corresponds to a VALUES LESS THAN clause that specifies a non-inclusive date value as a high bound. In this example, the partition analyzer 134 may also determine that each partition corresponds to a range of one year if the VALUES LESS THAN clause corresponding to the partitions specify non-inclusive high bounds of January $1^{st}$ of different years for a series of consecutive years. In some embodiments, the partition analyzer 134 may determine a high bound and a low bound associated with each partition based on the range partition definition associated with the partitions. For example, the partition analyzer 134 may determine that a partition is associated with a high bound of 31 Dec. 2010 if the range partition definition associated with the partition corresponds to a VALUES LESS THAN 1 Jan. 2011 clause. In this example, the partition analyzer 134 may also determine that the "next highest partition" (i.e., the partition including rows having dates that follow the dates in the previous or "next lowest partition") is associated with a low bound of 1 Jan. 2011.

In addition to identifying functions included in a parsed query 112, the function analyzer 132 of the optimizer 130 may also work in conjunction with the partition analyzer 134 to determine if a query 110 is capable of partition-wise execution based on one or more partition-wise function rules 137. The partition-wise function rules 137 may specify conditions that must be satisfied in order for a query 110 to be capable of being executed in a partition-wise manner. In some embodiments, a partition-wise function rule 137 may specify that a query 110 directed to a range-partitioned table is capable of being executed in a partition-wise manner if the query 110 includes one or more operation keys that match or are a superset of the table partitioning key(s). A partition-wise function rule 137 also may specify that a query 110 directed to a range-partitioned table is capable of being executed in a partition-wise manner if the query 110 includes an operation key that is a function over a column that corresponds to a table partitioning key. For example, if a table is range-partitioned by month over a column called "time_id," a partition-wise function rule 137 may specify that a query 110 directed to the table is capable of being executed in a partition-wise manner if the query 110 includes a GROUP BY clause with a function over the table partitioning key (e.g., GROUP BY MONTH(time_id)) or a window function over the table partitioning key (e.g., OVER (partition by MONTH(time_id))).

Furthermore, the function analyzer 132 may analyze a function with respect to the bounds of each partition of a partitioned table to determine a set of values associated with each partition. In some embodiments, the function analyzer 132 may evaluate each function on a high bound and a low bound associated with each partition to obtain a high value and a low value, respectively. For example, suppose that the partition analyzer 134 has determined that a table is range-partitioned by date, such that each partition corresponds to a range of one month, in which a range partition definition associated with a partition corresponds to a VALUES LESS THAN 1 Feb. 2017 clause. In this example, if the partition includes rows having table partitioning key values ranging from 1 Jan. 2017 to 31 Jan. 2017, the partition analyzer 134 may determine that the low bound of the partition is 1 Jan. 2017 and that the high bound of the partition is 31 Jan. 2017. Continuing with this example, if the function analyzer 132 evaluates a function which extracts the month from a specified field (e.g., EXTRACT(month FROM date)) on the low bound and the high bound of the partition, the function analyzer will obtain a low value and a high value associated with this partition that both correspond to the value of "JAN." In this example, the function analyzer 132 may then repeat this process for each additional partition.

Once the function analyzer 132 has determined a set of values associated with each partition of a table, the function analyzer 132 may compare the sets of values associated with different partitions and determine whether any values associated with different partitions match. Depending on whether any values associated with different partitions match, the optimizer 130 may generate an execution plan 140 that aggregates results for each partition after executing the query 110 in a partition-wise manner. In some embodiments, the function analyzer 132 may also compare the sets of values associated with different partitions of a partitioned table with one or more functions over the table partitioning key(s), in which the functions are included in a predicate of a query 110. In such embodiments, depending on whether there is a correlation between any values associated with different partitions and the function(s), the optimizer 130 may generate an execution plan 140 that involves pruning one or more partitions.

The execution plan 140 generated by the optimizer 130 is a combination of steps for executing the query 110. The execution plan 140 may include information describing a method by which each table mentioned in the query 110 is to be accessed, a method by which tables to be joined in the query 110 are to be joined, etc. In embodiments in which the query 110 includes multiple query blocks, the execution plan 140 generated by the optimizer 130 may include a sub-execution plan for each query block.

In some embodiments, to generate the execution plan 140, the optimizer 130 may first generate multiple candidate plans and select the most efficient candidate plan to be the execution plan 140. In such embodiments, each candidate plan may involve different access methods (e.g., full table scans or index scans), different join orders or methods, and different query transformations. The optimizer 130 may compute an estimated cost of each candidate plan (e.g., in terms of I/O, CPU, etc.), compare the estimated cost of each candidate plan, and select the candidate plan with the lowest estimated cost to be the execution plan 140. The optimizer 130 may access the data dictionary 138 to retrieve information about each database controlled by the data processing system to generate and to compute an estimated cost of each candidate plan.

To illustrate how the optimizer 130 may generate the execution plan 140 by first generating multiple candidate plans, suppose that the query 110 received at the query compiler 120 is requesting information from a table of employee information about employees who are managers. The optimizer 130 may generate two candidate plans for executing the query 110, in which the first candidate plan involves performing a full table scan and the second candidate plan involves reading an index and then accessing the table by a rowid stored as an entry in the index. The optimizer 130 may compute an estimated cost for each candidate plan (e.g., in terms of memory, CPU, etc.) based on information stored in the data dictionary 138 that indicates a percentage of the employees listed in the table who are managers. If the information stored in the data dictionary 138 indicates that 90% of the employees listed in the table are managers, it would likely be more efficient to execute the query 110 by performing a full table scan rather than by reading an index and then accessing the table by rowid. Therefore, the optimizer 130 will likely determine that the estimated cost of the first candidate plan is lower than the estimated cost of the second candidate plan. If the estimated cost of the first candidate plan is indeed lower than the estimated cost of the second candidate plan, the optimizer 130 will select the first candidate plan to be the execution plan 140.

The query 110 may be executed according to the execution plan 140 (e.g., by an SQL engine of the data processing system). For example, if the optimizer 130 generates an execution plan 140 that does not aggregate results for each partition after executing a query 110 in a partition-wise manner, execution of the query 110 is complete after executing the query 110 over each partition. Alternatively, in the above example, if the optimizer 130 generates an execution plan 140 that aggregates results for each partition after executing a query 110 in a partition-wise manner, execution of the query 110 is not complete until the query 110 has been executed over each partition and the results for each partition have been aggregated. In the above examples, if the optimizer 130 generates an execution plan 140 that involves pruning one or more partitions, these partitions may be pruned from processing, such that the query 110 is only executed over the remaining partition(s). When execution of the query 110 is complete, a set of results may be returned to the client 105.

Function Semantic Based Partition-Wise SQL Execution

Figure 3:
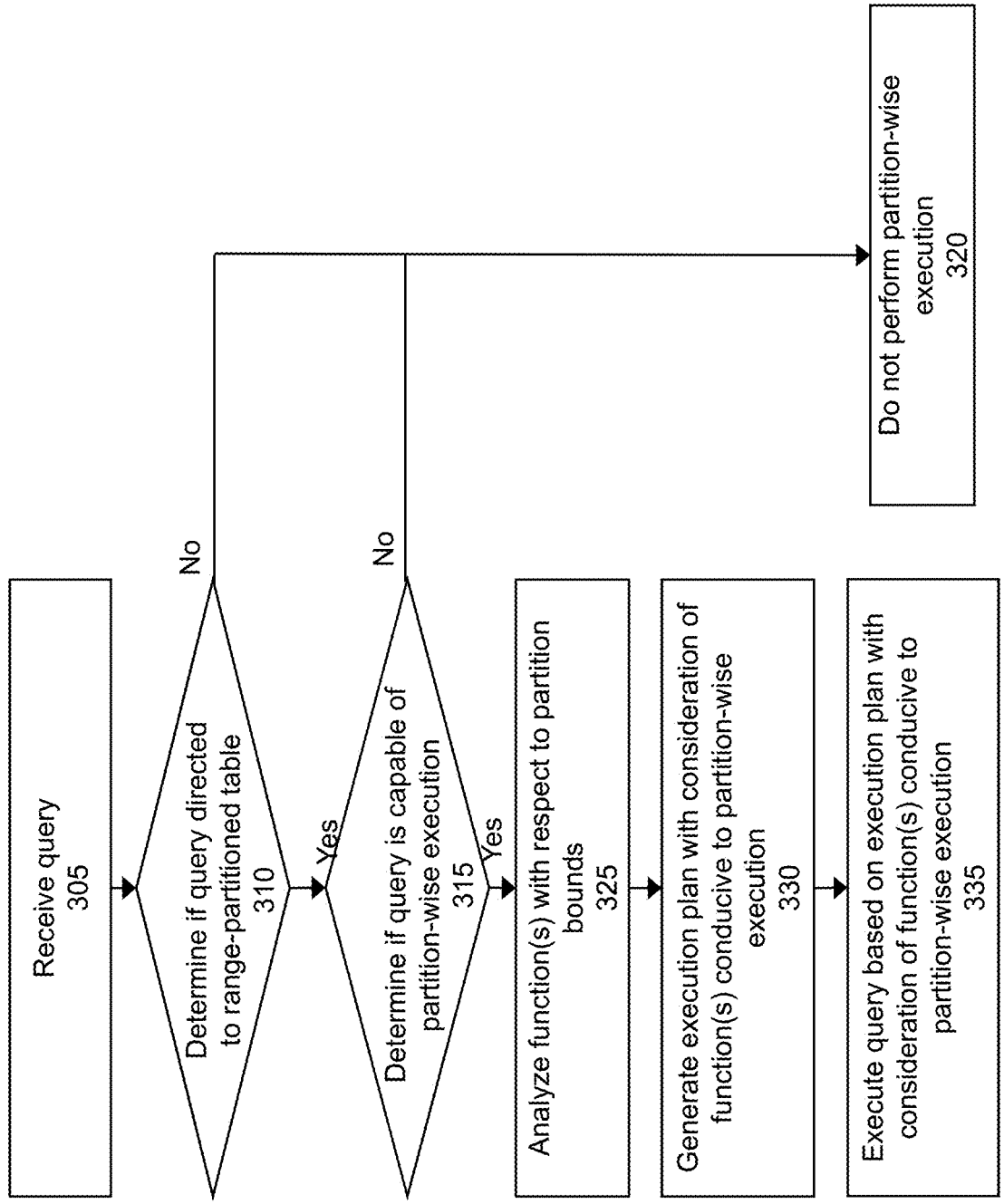
FIG. 3 is a flowchart for determining whether to execute a query in a data processing system with consideration of one or more functions conducive to partition-wise execution according to some embodiments of the invention.
Figure 4A:
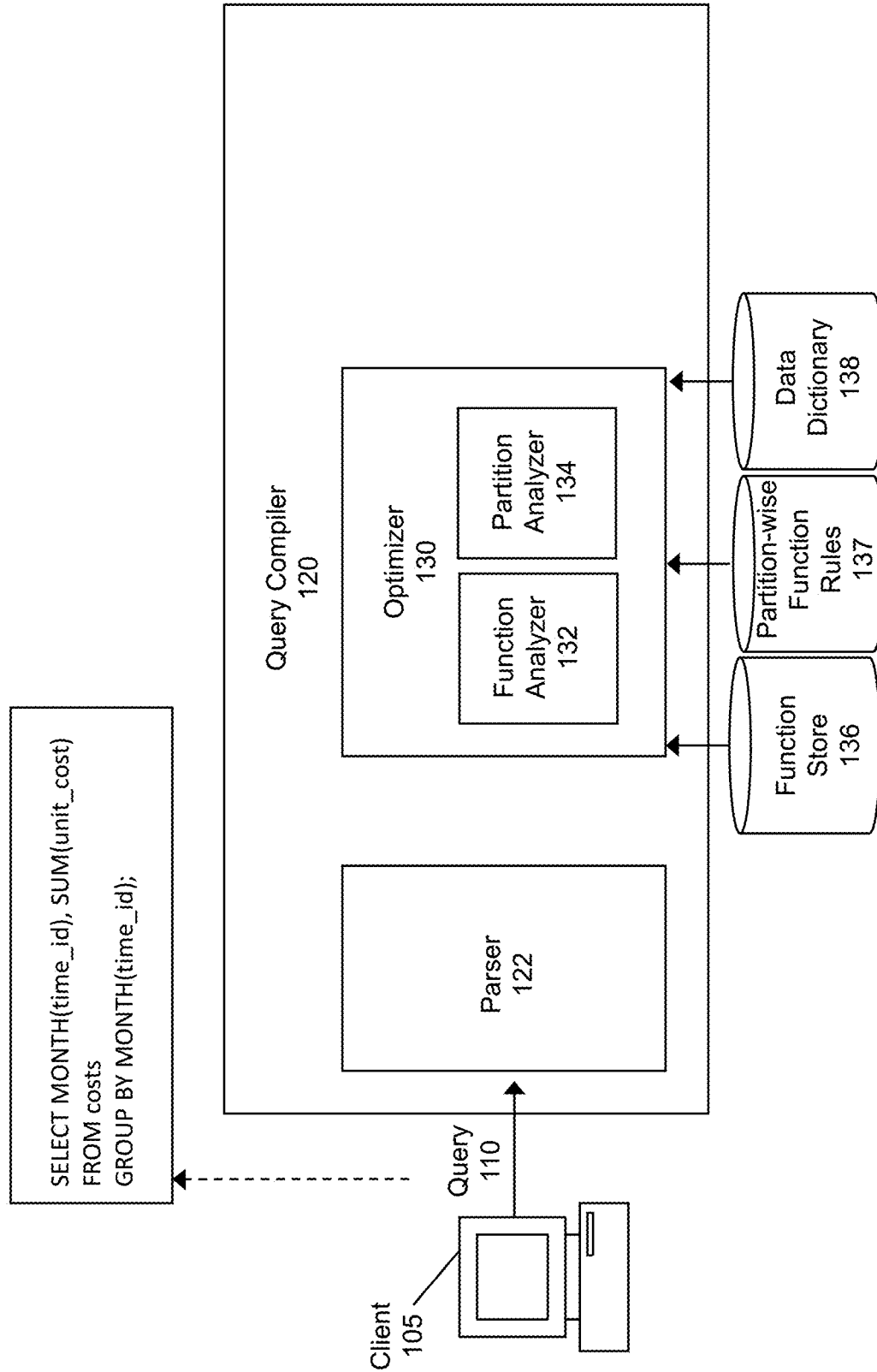

FIG. 3 is a flowchart for determining whether to execute a query in a data processing system with consideration of one or more functions conducive to partition-wise execution according to some embodiments of the invention. In some embodiments, the steps may be performed in an order different from that described in FIG. 3. As illustrated in FIG. 3, the flowchart begins when the query compiler 120 of the data processing system receives 305 a query 110 (e.g., an SQL statement). The query 110 may be received 305 directly from the client 105 or indirectly from the client 105 (e.g., via a local database server). The query 110 may be directed to one or more tables stored in one or more databases. As shown in FIG. 4A, which illustrates an example of generating an execution plan with consideration of one or more functions conducive to partition-wise execution, suppose the query compiler 120 receives 305 the following query 110 from the client 105:

SELECT MONTH(time_id), SUM(unit_cost) FROM costs GROUP BY MONTH(time_id);

In this example, "time_id" and "unit_cost" are columns in a table named "costs" and the time_id column corresponds to a table partitioning key used to partition the costs table by range.

Referring back to FIG. 3, upon receiving 305 the query 110, the parser 122 at the query compiler 120 may perform various checks on the query 110, as described above in conjunction with FIG. 1. In the above example, the parser 122 may perform a syntactic check on the query 110 (e.g., by checking for misspelled keywords) as well as a semantic check (e.g., by making sure that the table named "costs" exists and that the columns named "time_id" and "unit_ cost" exist within the costs table). The parser 122 may also check a shared buffer cache to determine whether a version of an execution plan 140 that corresponds to the query 110 already exists so that steps performed by the optimizer 130 may be skipped. Once the parser 122 has completed performing the checks on the query 110, the parsed query 112 may be passed to the optimizer 130.

Based on the parsed query 112 received from the parser 122, the optimizer 130 may determine 310 if the query 110 is directed to a range-partitioned table. The partition analyzer 134 may determine 310 if the query 110 is directed to a range-partitioned table based on information stored in the data dictionary 138. The partition analyzer 134 may access various types of information stored in the data dictionary 138 about a table to determine whether the table is a partitioned table. In some embodiments, the partition analyzer 134 may access information describing a partitioning strategy used to partition the table (e.g., range partitioning, hash partitioning, and list partitioning), information identifying a table partitioning key used to partition the table, range partition definitions associated with each partition, etc. For example, suppose that the table in the example of FIG. 4B, which continues the example discussed above with regard to FIG. 4A, is associated with the costs table and is accessed from the data dictionary 138 by the partition analyzer 134. In this example, the range partition definitions associated with the partitions correspond to VALUES LESS THAN clauses that specify the first day of different months for a series of consecutive months as non-inclusive high bounds. Continuing with this example, based on the range partition definition associated with each partition, the partition analyzer 134 may determine 310 that the query 110 is directed to a range-partitioned table.

As shown in FIG. 3, if the partition analyzer 134 determines 310 that the query 110 is not directed to a range-partitioned table, the data processing system will not perform 320 partition-wise execution of the query 110. Conversely, if the partition analyzer 134 determines 310 that the query 110 is directed to a range-partitioned table, the optimizer 130 may determine 315 if the query 110 is capable of partition-wise execution.

As described above, the function analyzer 132 of the optimizer 130 may determine 315 if the query 110 is capable of partition-wise execution based on one or more partition-wise function rules 137. The partition-wise function rules 137 may specify conditions that must be satisfied in order for the query 110 to be capable of being executed in a partition-wise manner. In some embodiments, a partition-wise function rule 137 may specify that a query 110 directed to a range-partitioned table is capable of being executed in a partition-wise manner if the query 110 includes one or more operation keys that match or are a superset of the table partitioning key(s). A partition-wise function rule 137 also may specify that a query 110 directed to a range-partitioned table is capable of being executed in a partition-wise manner if the query 110 includes an operation key that is a function over a column that corresponds to a table partitioning key. For example, if a table is range-partitioned by quarter (i.e., three month periods) over a column called "time_id," a partition-wise function rule 137 may specify that a query 110 directed to the table is capable of being executed in a partition-wise manner if the query 110 includes a GROUP BY clause with a function over the table partitioning key (e.g., GROUP BY MONTH(time_id)) or a window function over the table partitioning key (e.g., OVER(partition by MONTH(time_id))). Referring again to the examples of FIGS. 4A-4B, since the query 110 received 305 by the query compiler 120 includes the clause: "GROUP BY MONTH (time_id)," the operation key includes a function over the column that corresponds to the table partitioning key (i.e., MONTH(time_id)).

Referring again to FIG. 3, if the function analyzer 132 determines 315 that the query 110 is not capable of partition-wise execution, the data processing system will not perform 320 partition-wise execution of the query 110. Conversely, if the function analyzer 132 determines 315 that the query 110 is capable of partition-wise execution, the function analyzer 132 may analyze 325 one or more functions included in the query 110 with respect to the table partition bounds.

The function analyzer 132 may analyze 325 one or more functions included in the query 110 with respect to the bounds of each partition of the table to determine a set of values associated with each partition. In some embodiments, the function analyzer 132 may evaluate a function on a high bound and a low bound of each partition to obtain a high value and a low value, respectively. For example, as shown in FIG. 4B, the P1 partition has a range partition definition corresponding to a VALUES LESS THAN 1 Feb. 2017 clause. In this example, since this partition includes rows having table partitioning key values ranging from an undefined date to 31 Jan. 2017, the partition analyzer 134 may determine that the low bound of the P1 partition is undefined and that the high bound of the P1 partition is 31 Jan. 2017. Continuing with this example, if the function analyzer 132 evaluates a function called "MONTH" (which extracts the month from a given date) on the low bound and the high bound of the P1 partition, the function analyzer 132 will obtain a low value associated with this partition that is undefined and a high value associated with this partition that corresponds to the value of "JAN." The function analyzer 132 may then repeat this process for each additional partition in this example.

To analyze (325) function(s) included in the query 110 with respect to the bounds of each partition of the table, the function analyzer 132 may also compare the sets of values associated with different partitions and determine whether any values associated with different partitions match. In the example of FIG. 4B, based on a comparison of the sets of values associated with different partitions, the function analyzer 132 may determine that the low value and the high value associated with each partition do not match a low value or a high value associated with any other partitions. In some embodiments, the function analyzer 132 may stop comparing the sets of values for different partitions upon determining that any values for different partitions match.

Figure 4C:
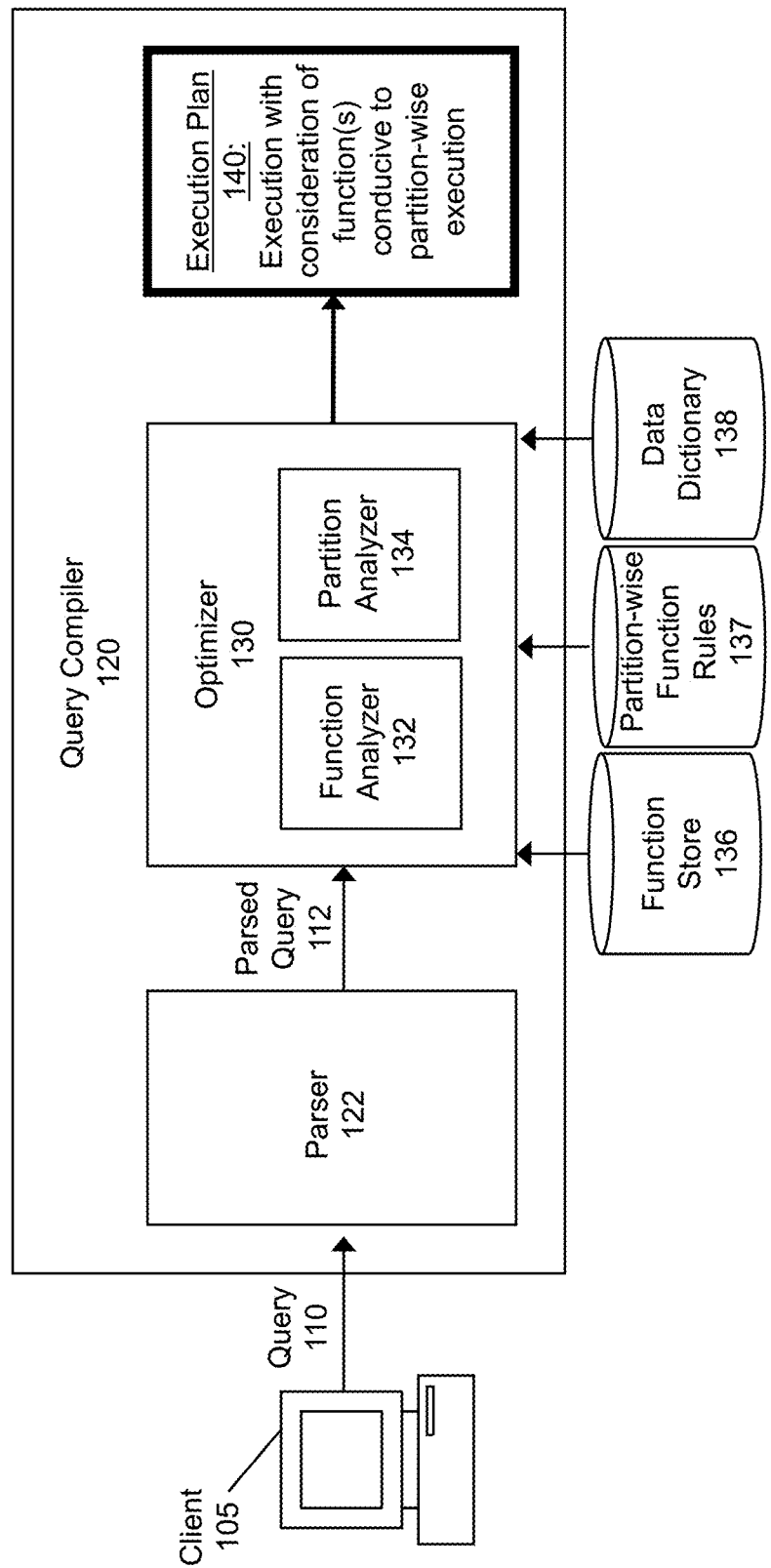

Referring again to FIG. 3, based on the analysis of the function(s) included in the query 110 with respect to the bounds of each partition, the optimizer 130 may generate 330 an execution plan 140 with consideration of function(s) that are conducive to partition-wise execution (e.g., as shown in FIG. 4C, which continues the example discussed above with regard to FIGS. 4A and 4B). In some embodiments, if the function analyzer 132 determines that none of the values associated with different partitions match, the execution plan 140 may involve executing the query 110 in a partition-wise manner without aggregating the results for each partition. However, in embodiments in which at least some of the values associated with different partitions match, the execution plan 140 may also involve aggregating the results for each partition after executing the query 110 in a partition-wise manner. As described above, the execution plan 140 is a combination of steps for executing the query 110, which may include information describing a method by which each table mentioned in the query 110 is to be accessed, a method by which tables to be joined in the query 110 are to be joined, etc. In embodiments in which the query 110 includes multiple query blocks, the execution plan 140 generated by the optimizer 130 may include a sub-execution plan for each query block.

Referring once more to FIG. 3, the query 110 may be executed 335 based on the execution plan 140 (e.g., by an SQL engine of the data processing system). For example, if the optimizer 130 generates 330 an execution plan 140 that does not involve aggregating results for each partition after executing a query 110 in a partition-wise manner, execution of the query 110 is complete once the query 110 has been executed over each partition. Alternatively, in the above example, if the optimizer 130 generates 330 an execution plan 140 that aggregates results for each partition after executing the query 110 in a partition-wise manner, execution of the query 110 is not complete until the query 110 has been executed over each partition and the results for each partition have been aggregated. In some embodiments, executing 335 the query 110 based on the execution plan 140 involves pruning one or more partitions, which is further described below. In such embodiments, one or more partitions may be pruned from processing, such that the query 110 is only executed 335 over the remaining partitions. When execution of the query 110 is complete, a set of results may be returned to the client 105.

FIG. 5 is a flowchart for analyzing one or more functions with respect to table partition bounds of a partitioned table and generating an execution plan with consideration of functions conducive to partition-wise execution according to some embodiments of the invention. In some embodiments, the steps may be performed in an order different from that described in FIG. 5.

Figure 6B:
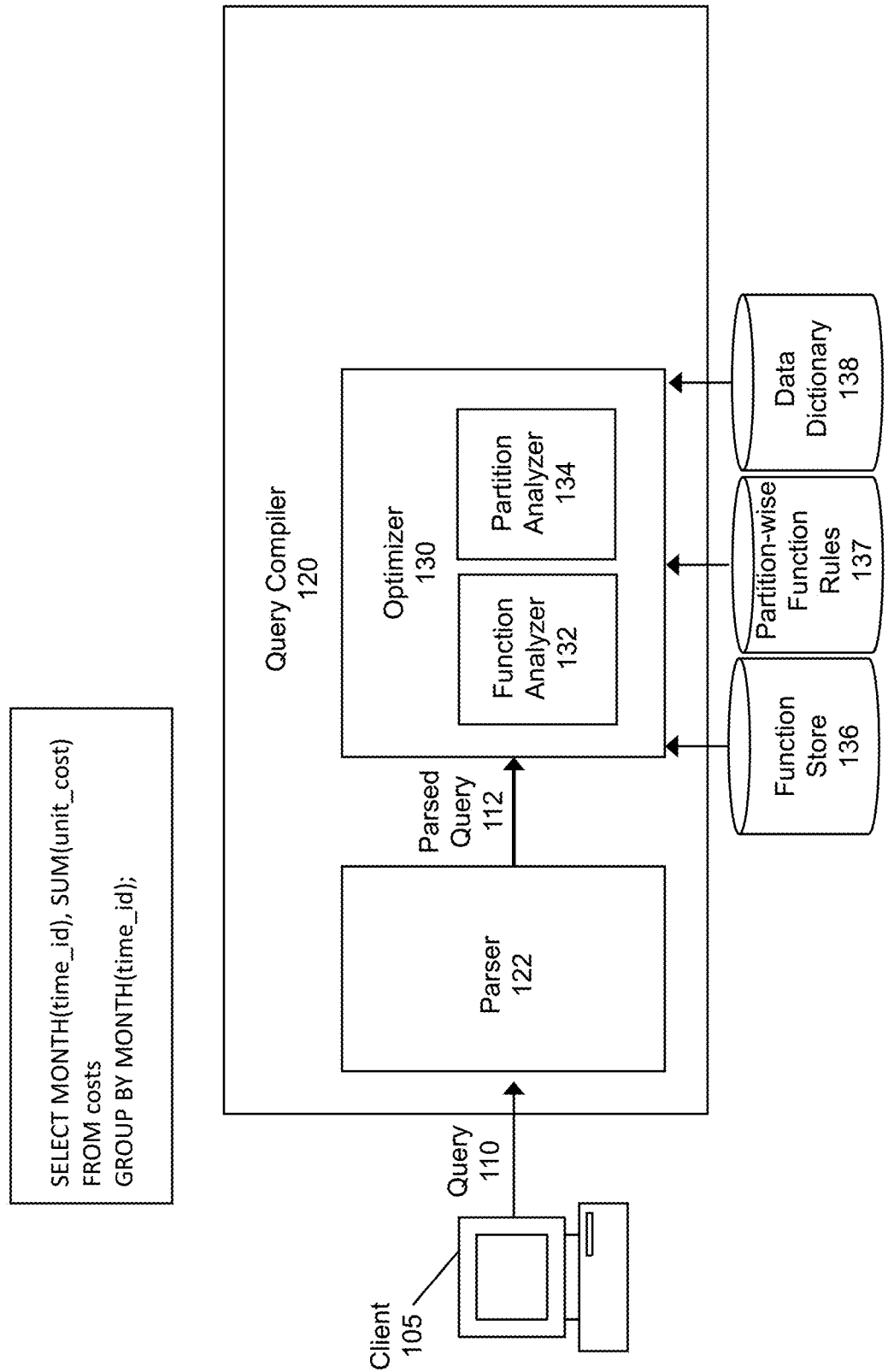
Figure 6C:
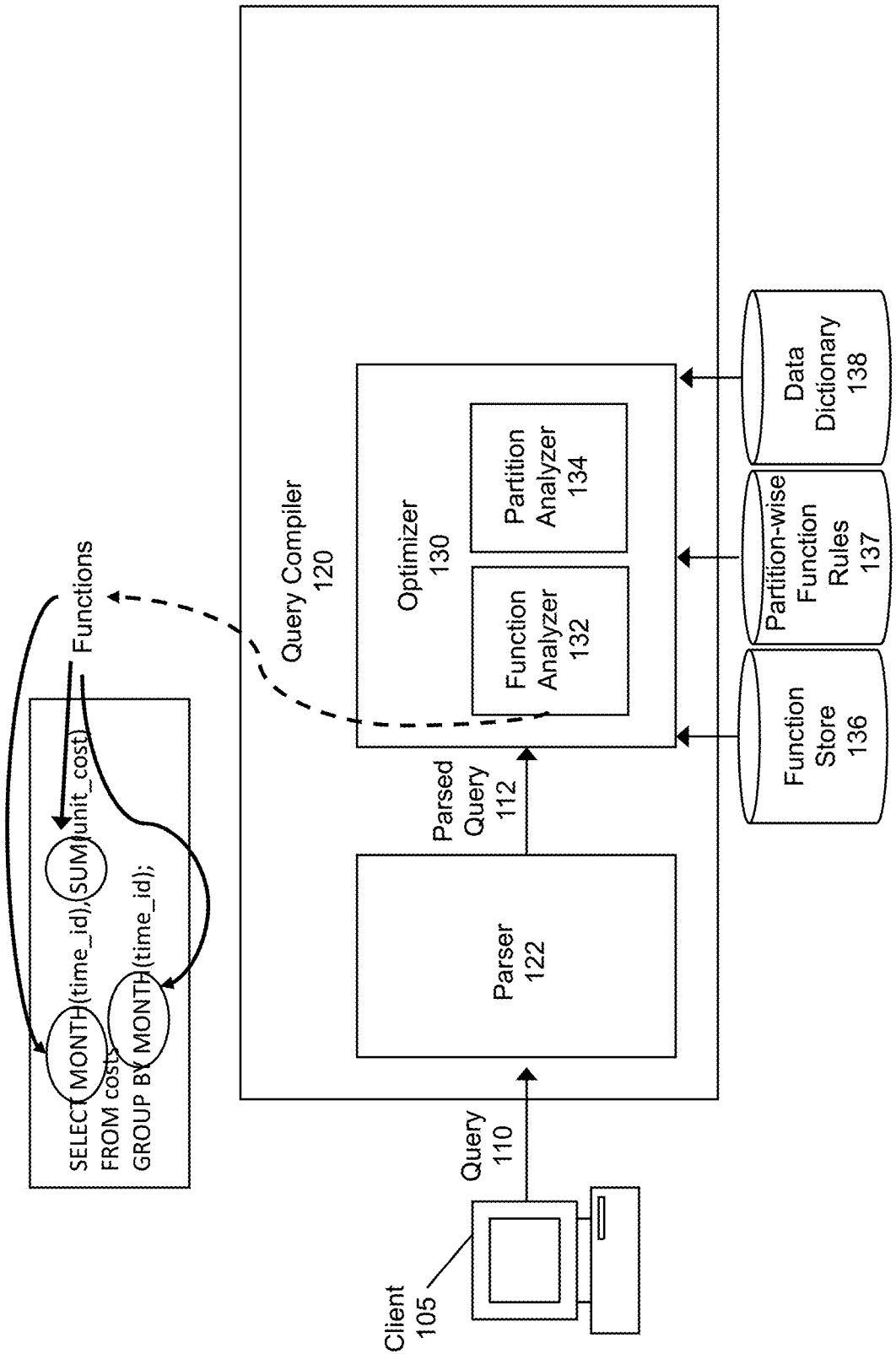

As shown in FIG. 5, to analyze 325 one or more functions included in the query 110 with respect to the table partition bounds, the function analyzer 132 first identifies 505 each function specified over the operation key(s) of the query 110 that is a function over the table partitioning key(s). The function analyzer 132 may identify 505 the function(s) based on information stored in the function store 136. To illustrate this, reference will now be made to FIG. 6A, which illustrates an example of generating an execution plan to execute a query in a partition-wise manner without aggregating results of each partition based on semantics of a function of the query. Suppose the query compiler 120 receives 305 the following query 110 shown in FIG. 6A:

SELECT MONTH(time_id), SUM(unit_cost) FROM costs GROUP BY MONTH(time_id);

In this example, the MONTH function extracts the month from the date value in the time_id column and costs is a range-partitioned table that is partitioned over the time_id column. In this example, as shown in FIG. 6B, which continues the example discussed above with regard to FIG. 6A, once the optimizer 130 has received the parsed query 112, and has determined 310 that the query 110 is directed to a range-partitioned table and has also determined 315 that the query 110 is capable of partition-wise execution, the function analyzer 132 may analyze 325 one or more functions included in the query 110 with respect to the table partition bounds. The function analyzer 132 may do so by accessing the function store 136 and identifying the SUM function as a built-in SQL function and the MONTH function as a user-defined function, as illustrated in FIG. 6C, which continues the example discussed above with regard to FIGS. 6A and 6B. The function analyzer 132 may then determine whether any operation key(s) of the query include(s) function(s) over the table partitioning key(s) and identify 505 these function(s). Since the query 110 received 305 by the query compiler 120 includes the clause: "GROUP BY MONTH(time_id)," the GROUP BY operation is to be performed on the MONTH function, the MONTH function is a function over the time_id column, and the time_id column corresponds to the table partitioning key. Therefore, the function analyzer 132 may identify 505 the MONTH function as a function that is specified over the operation key of the query 110 that is also a function over the table partitioning key.

Referring back to FIG. 5, for each function specified over an operation key of the query 110 that is a function over the table partitioning key(s), the partition analyzer 134 retrieves (510) partition information for the range-partitioned table to which the query 110 is directed from the data dictionary 138. Partition information for the range-partitioned table may include information that identifies the column(s) of the table corresponding to the table partitioning key(s), information that describes a partition definition associated with each partition, or any other types of information describing one or more partitions of the table. For example, referring to FIG. 6D, which continues the example discussed above with regard to FIGS. 6A-6C, the partition analyzer 134 may retrieve information describing a range partition definition associated with each partition, such that a first partition (Q1) is associated with a partition definition that corresponds to a VALUES LESS THAN 1 Apr. 2017 clause. In this example, since the first partition includes rows having a table partitioning key value ranging from an undefined date to 31 Mar. 2017, the partition analyzer 134 may determine that the low bound of the first partition is undefined and that the high bound of the first partition is 31 Mar. 2017 and repeat this process for each additional partition (Q2, Q3, and Q4).

Referring again to FIG. 5, the function analyzer 132 may obtain 515 a set of values for each partition by evaluating each function on the bounds of the partition. In some embodiments, the set of values obtained 515 by the function analyzer 132 for a partition include a high value obtained 515 by evaluating the function on a high bound of the partition and a low value obtained 515 by evaluating the function on a low bound of the partition. Referring again to the example of FIG. 6D, if the function analyzer 132 evaluates the MONTH function (which extracts the month from a given date) on the low bound and the high bound of the first partition (Q1), the function analyzer will obtain 515 a low value for this partition that is undefined and a high value for this partition that corresponds to the value of "MAR." In this example, the function analyzer 132 may then repeat this process for each additional partition (Q2, Q3, and Q4).

As shown in FIG. 5, once the function analyzer 132 has obtained 515 a set of values for each partition of a partitioned table, the function analyzer 132 may compare 520 the sets of values for different partitions. In some embodiments, the function analyzer 132 may only compare (520) defined values for different partitions. For example, referring again to FIG. 6D, the function analyzer 132 may compare 520 the high value for the Q1 partition (MAR) with the low value and the high value for the Q2 partition (APR and JUN) and repeat this process until the defined values for different partitions have been compared 520 to each other. In some embodiments, the function analyzer 132 may stop comparing 520 the sets of values for different partitions if any values for different partitions match.

Figure 6E:
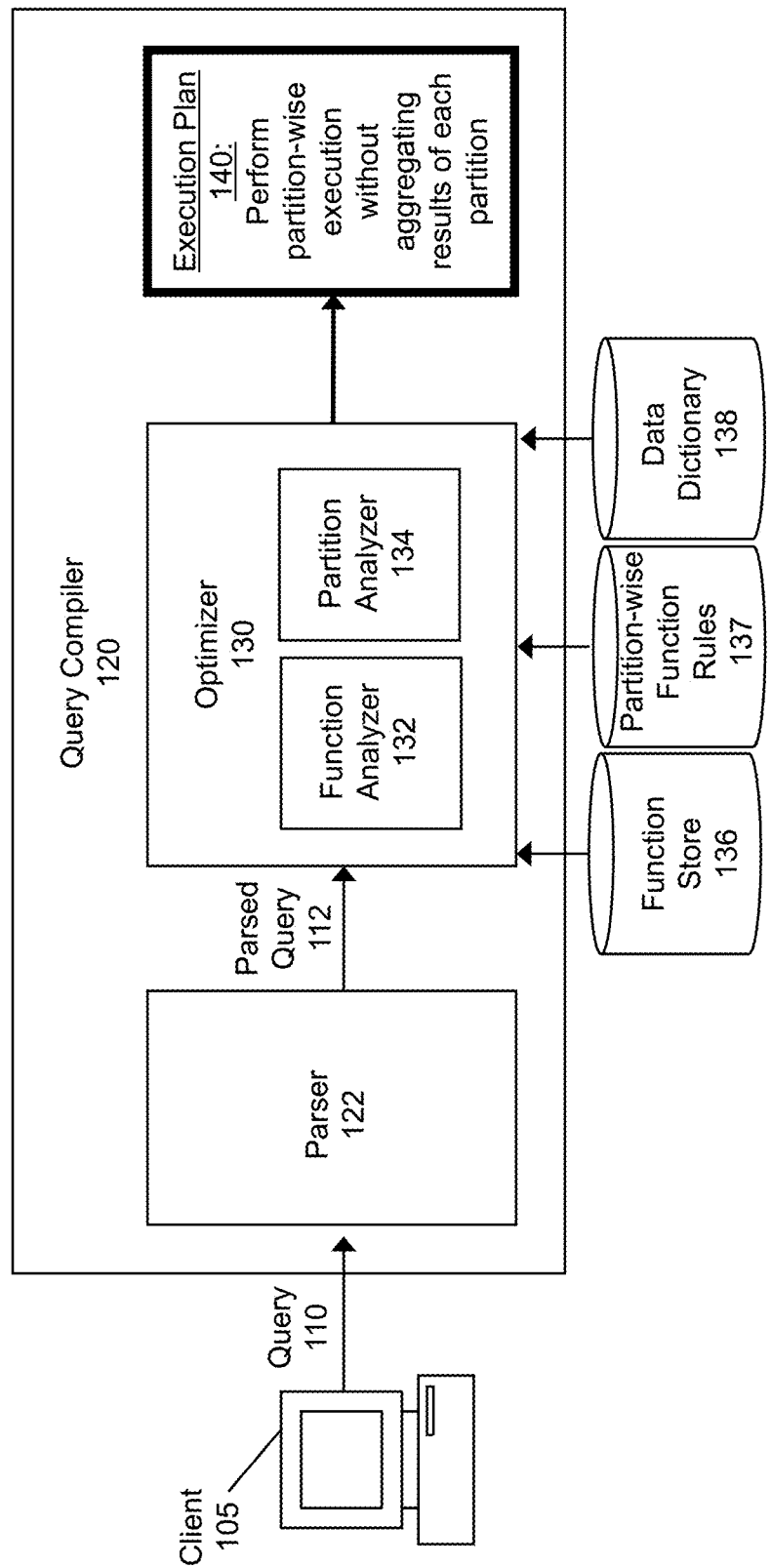

As illustrated in FIG. 5, the optimizer 130 may generate 330 an execution plan 140 based on whether the function analyzer 132 determines 525 if any values for different partitions match. If the function analyzer 132 determines 525 that none of the values associated with different partitions match, the optimizer 130 generates 530 an execution plan 140 to perform partition-wise execution of the query 110 without aggregating results of each partition. For example, the function analyzer 132 may determine 525 that none of the values for different partitions match in FIG. 6D. Therefore, as shown in FIG. 6E, which continues the example discussed above with regard to FIGS. 6A-6D, the optimizer 130 generates 530 an execution plan 140 to perform partition-wise execution of the query 110 without aggregating results of each partition. However, as shown in FIG. 5, if the function analyzer 132 determines 525 that any values associated with different partitions match, the optimizer 130 generates 535 an execution plan 140 to perform partition-wise execution and aggregates results for each partition after executing the query 110 in a partition-wise manner.

Figure 7A:
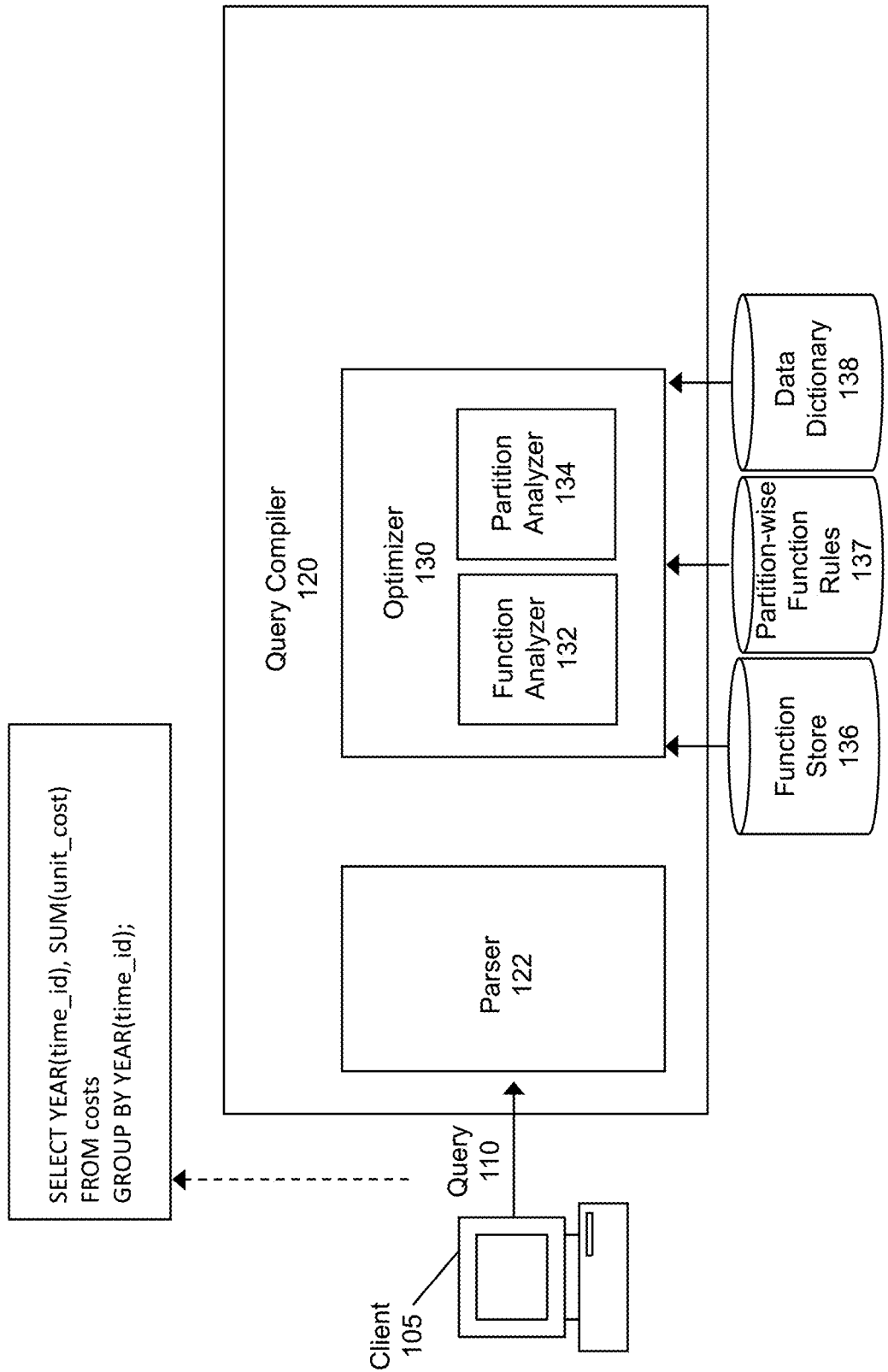
Figure 7B:
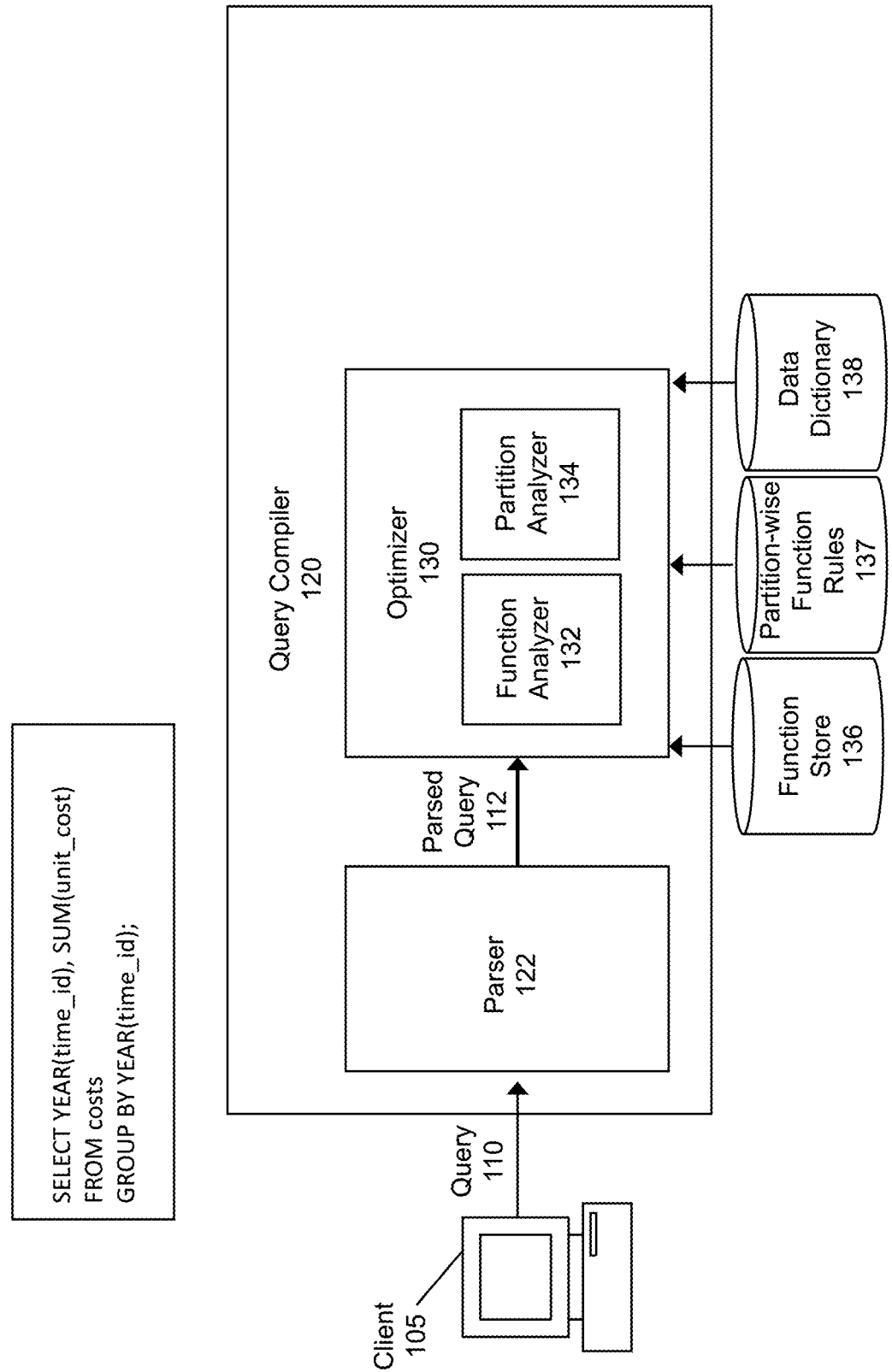
Figure 7C:
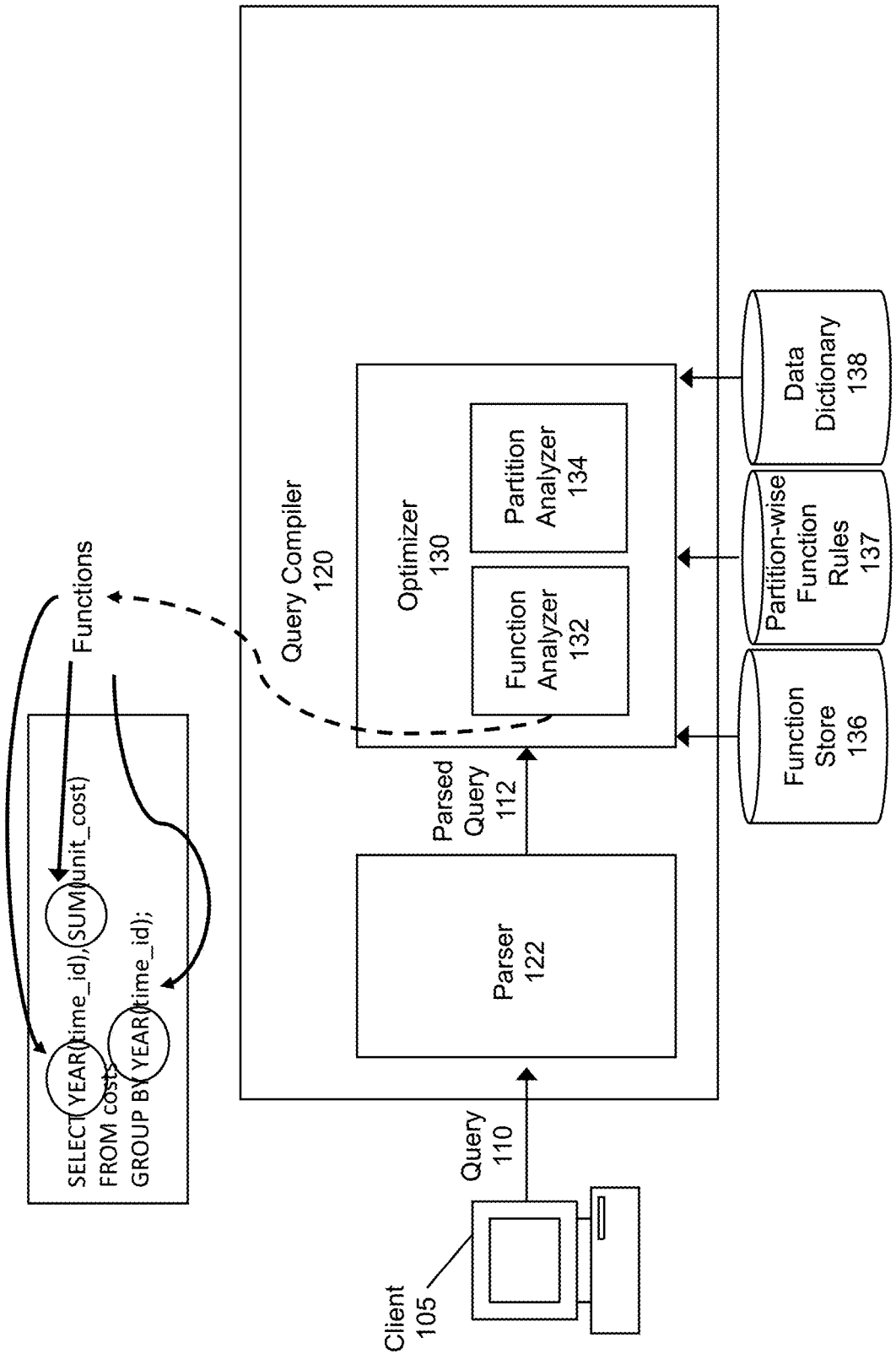

To illustrate an example of how the optimizer 130 would generate 535 an execution plan 140 to perform partition-wise execution and aggregate results for each partition after executing a query 110 in a partition-wise manner, some of the steps of FIGS. 3 and 5 will now be discussed in conjunction with FIGS. 7A-7E, which illustrate an example of generating an execution plan to execute a query in a partition-wise manner and to aggregate results of each partition based on semantics of a function of the query. Referring first to FIG. 7A, suppose the query compiler 120 receives 305 the following query 110:

SELECT YEAR(time_id), SUM(unit_cost) FROM costs
  GROUP BY YEAR(time_id);

In this example, the YEAR function extracts the year from the date time_id and costs is a range-partitioned table that is partitioned over the time_id column. In this example, once the optimizer 130 receives the parsed query 112, as shown in FIG. 7B and has determined 310 that the query 110 is directed to a range-partitioned table and has also determined 315 that the query 110 is capable of partition-wise execution, the function analyzer 132 may analyze 325 one or more functions included in the query 110 with respect to the table partition bounds. The function analyzer 132 may do so by accessing the function store 136 and identifying the SUM function as a built-in SQL function and the YEAR function as a user-defined function, as illustrated in FIG. 7C. Of the functions identified by the function analyzer 132, since the query 110 received 305 by the query compiler 120 includes the clause: "GROUP BY YEAR(time_id);" the function analyzer 132 may identify 505 the YEAR function as a function specified over the operation key of the query 110 that is a function over the table partitioning key.

For each function identified 505 by the function analyzer 132 specified over an operation key of the query 110 that is a function over the table partitioning key(s), the partition analyzer 134 retrieves (510) partition information for the range-partitioned table to which the query 110 is directed from the data dictionary 138. As described above, partition information for the range-partitioned table may include information that identifies the column(s) of the table corresponding to the table partitioning key(s), information that describes a partition definition associated with each partition, or any other types of information describing one or more partitions of the table. For example, referring to FIG. 7D, the partition analyzer 134 may retrieve information describing a range partition definition associated with each partition, such that a first partition (Q1) is associated with a range partition definition that corresponds to a VALUES LESS THAN 1 Apr. 2017 clause. In this example, since the first partition includes rows having a table partitioning key value ranging from an undefined date to 31 Mar. 2017, the partition analyzer 134 may determine that the low bound of the first partition is undefined and that the high bound of the first partition is 31 Mar. 2017 and repeat this process for each additional partition (Q2, Q3, and Q4).

As illustrated in FIG. 5, the function analyzer 132 may obtain 515 a set of values for each partition by evaluating each function on the bounds of the partition (e.g., on the high bound and on the low bound of each partition). Referring again to the example of FIG. 7D, if the function analyzer 132 evaluates the YEAR function (which extracts the year from a given date) on the low bound and the high bound of the first partition (Q1), the function analyzer will obtain 515 a low value for this partition that is undefined and a high value for this partition that corresponds to the value of "2017." In this example, the function analyzer 132 may then repeat this process for each additional partition (Q2, Q3, and Q4).

As shown in FIG. 5, once the function analyzer 132 has obtained 515 a set of values for each partition of a partitioned table, the function analyzer 132 may compare 520 the sets of values for different partitions. As described above, in some embodiments, the function analyzer 132 may only compare (520) defined values for different partitions. For example, referring again to FIG. 7D, the function analyzer 132 may compare the high value for the Q1 partition (2017) with the low value and the high value for the Q2 partition (2017 and 2017) and repeat this process until the defined values for different partitions have been compared to each other. As also described above, in some embodiments, the function analyzer 132 may stop comparing 520 the sets of values for different partitions upon determining that any values for different partitions match.

Figure 7E:
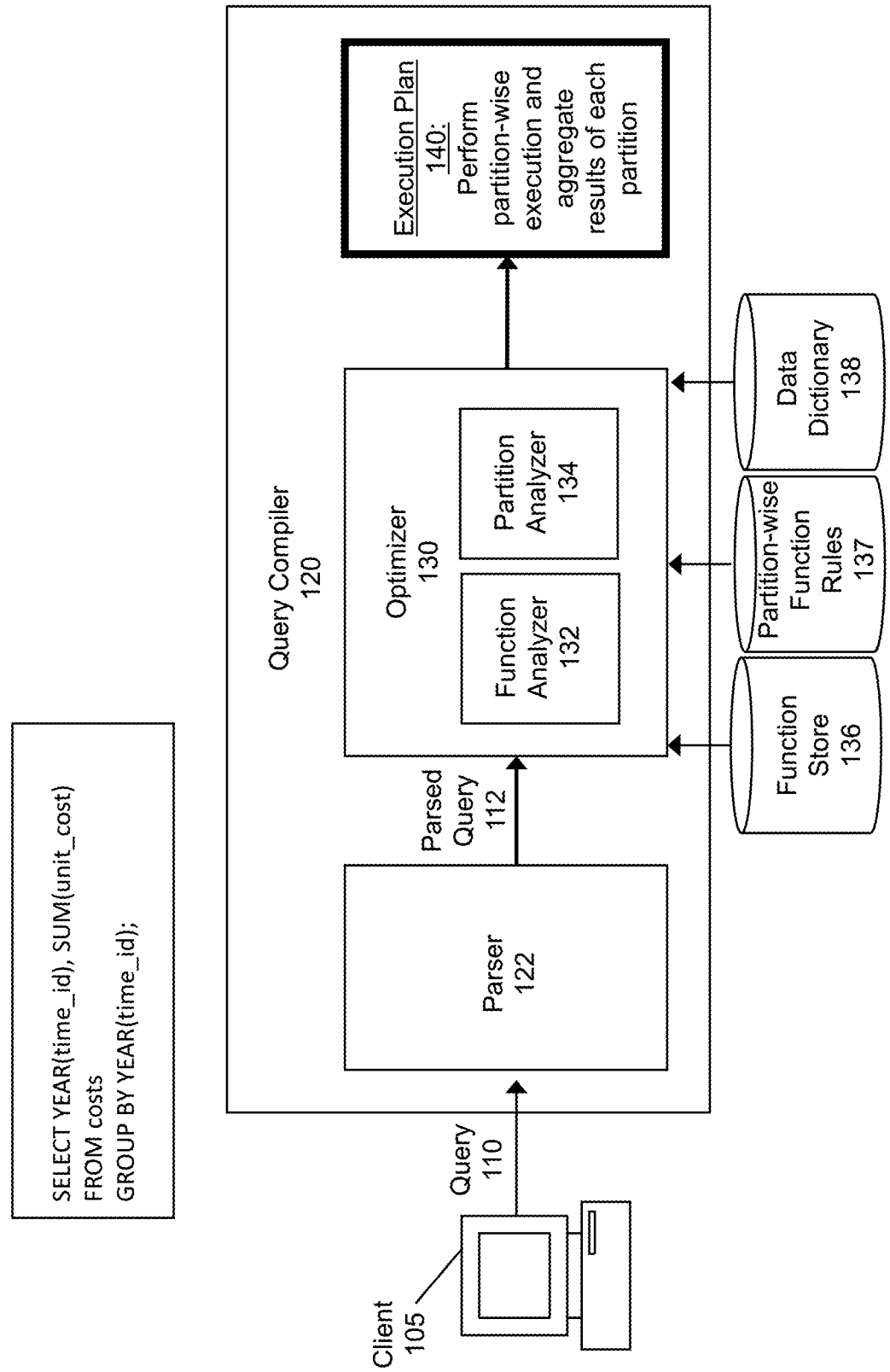

As described in FIG. 5, if the function analyzer 132 determines 525 that any values associated with different partitions match, the optimizer 130 generates 535 an execution plan 140 to perform partition-wise execution and aggregates results for each partition after executing the query 110 in a partition-wise manner. For example, the function analyzer 132 may determine 525 that at least some of the values for different partitions match in FIG. 7D. Therefore, as shown in FIG. 7E, the optimizer 130 generates 535 an execution plan 140 to perform partition-wise execution and aggregates results for each partition after executing the query 110 in a partition-wise manner.

Figure 8:
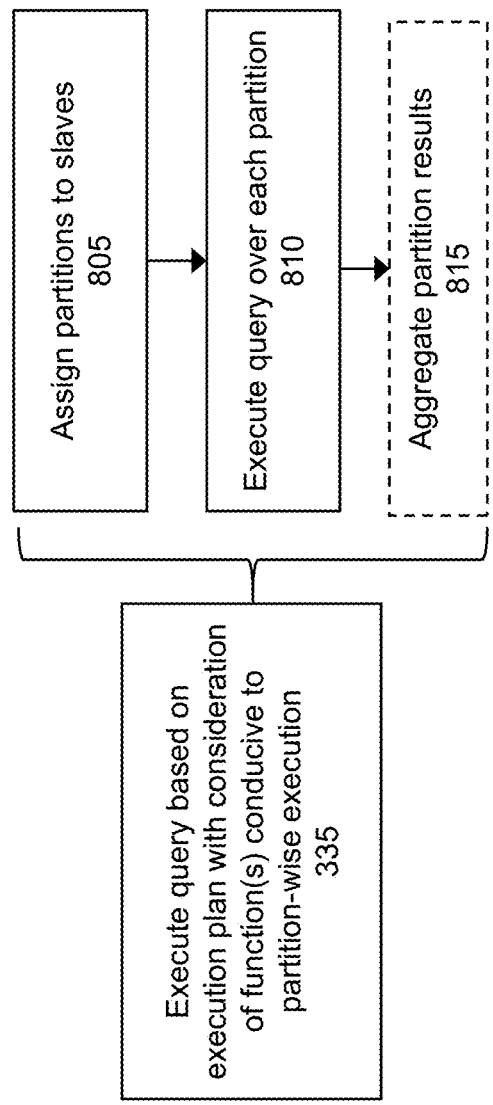
FIG. 8 is a flowchart for executing a query based on an execution plan with consideration of one or more functions conducive to partition-wise execution according to some embodiments of the invention.

FIG. 8 is a flowchart for executing a query based on an execution plan with consideration of one or more functions conducive to partition-wise execution according to some embodiments of the invention. In some embodiments, the steps may be performed in an order different from that described in FIG. 8.

Figure 9A:
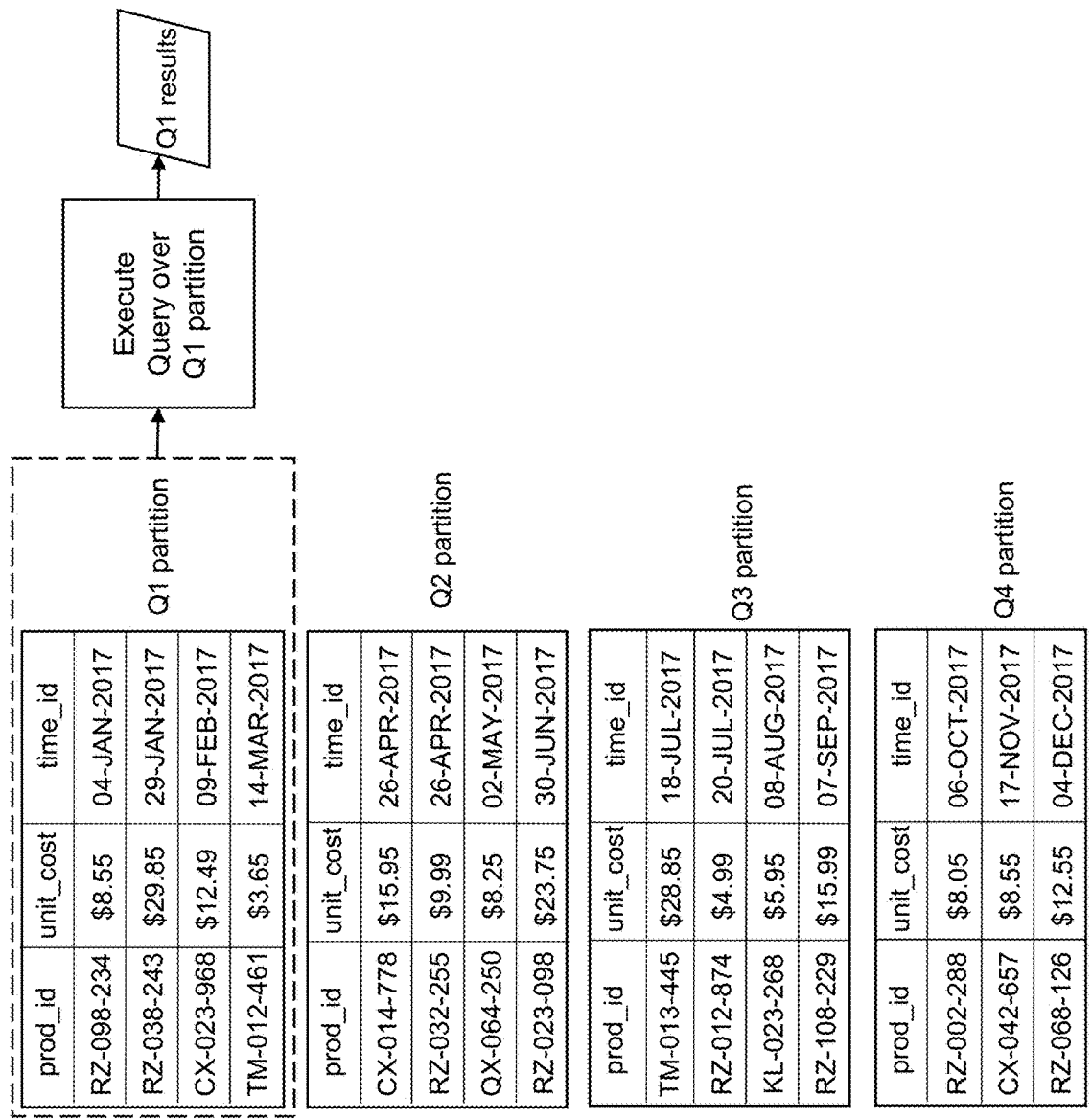
FIGS. 9A-9D illustrate an example of executing a query over a partition according to some embodiments of the invention.
Figure 9B:
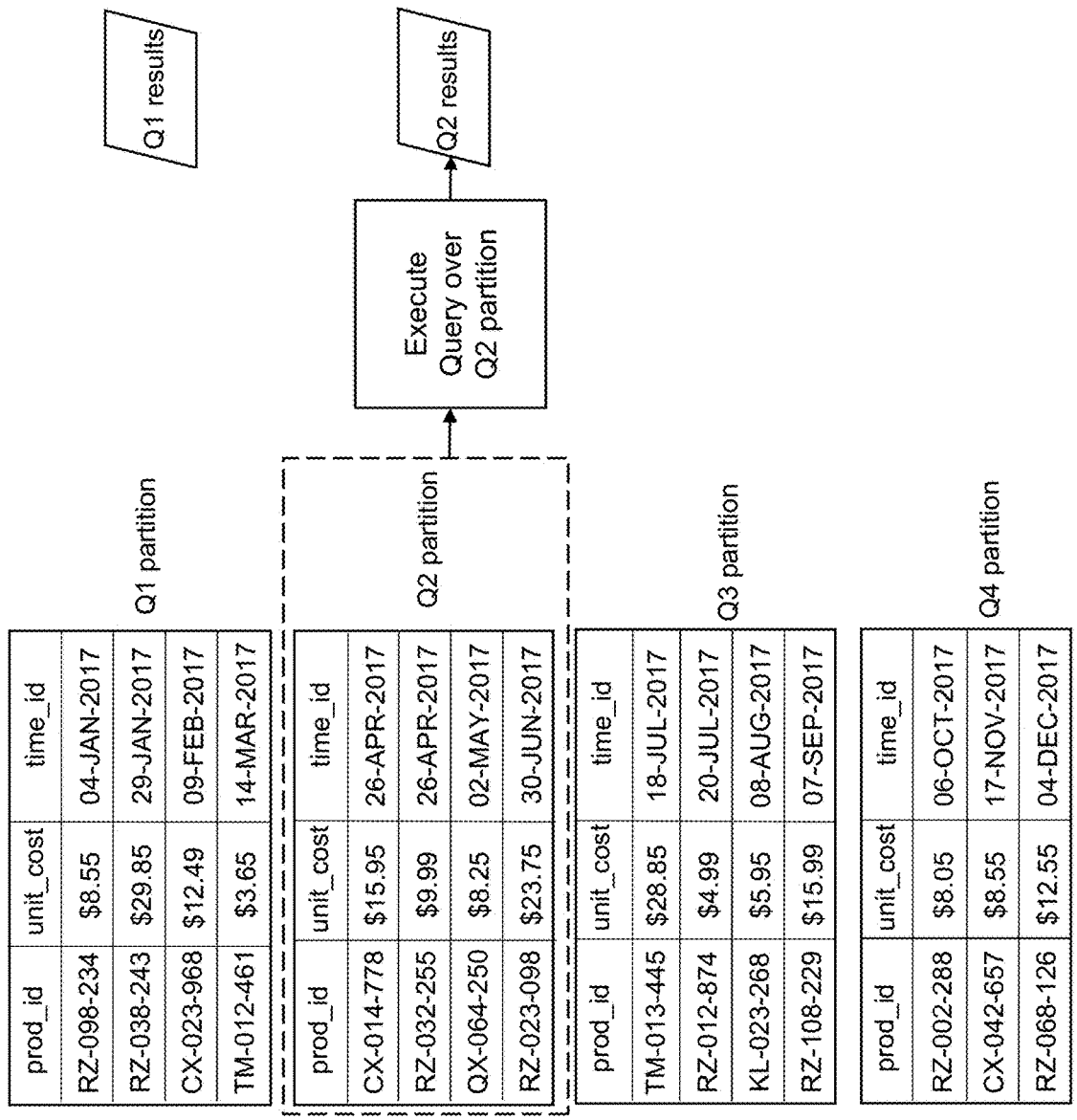
Figure 9C:
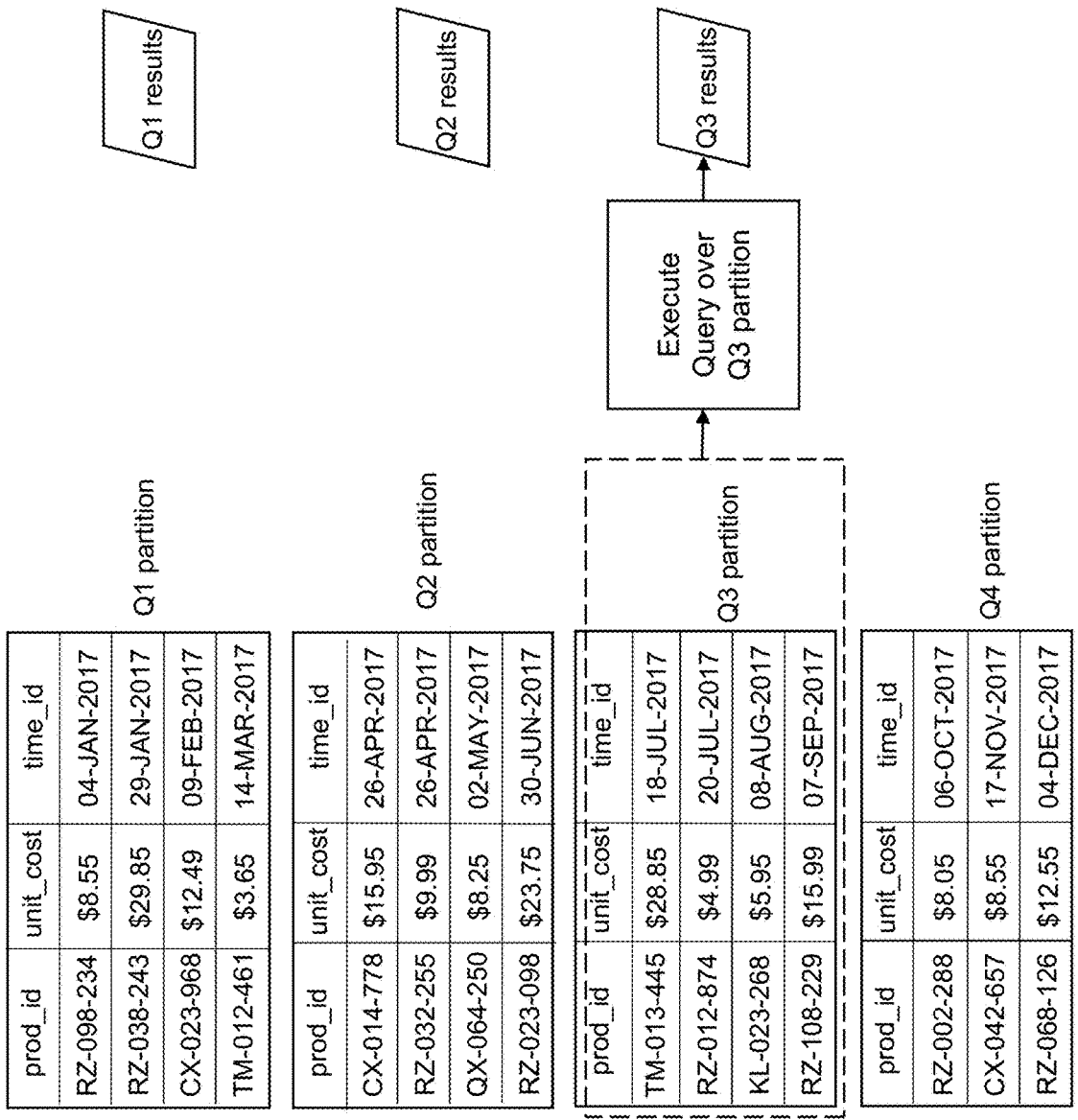
Figure 9D:
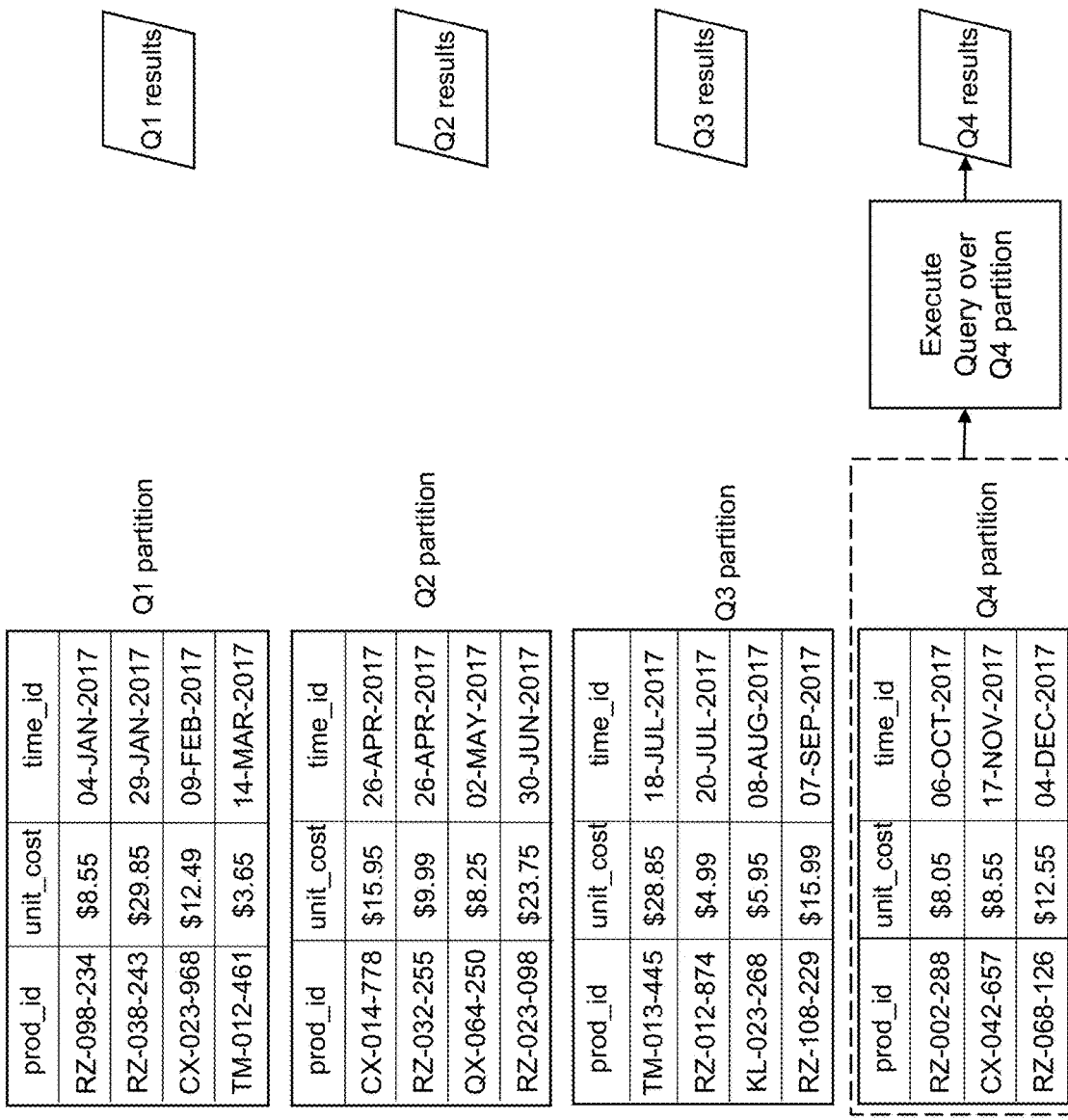

As shown in FIG. 8, to execute 335 a query 110 based on an execution plan 140 with consideration of function(s) conducive to partition-wise execution (e.g., by an SQL engine of the data processing system), each partition may be assigned 805 to a slave process. For example, to execute a query 110 directed to a partitioned table, a query coordinator process may assign (805) different partitions of the table to each of multiple slave processes. Once the partitions have been assigned 805 to the slave processes, the query 110 may be executed 810 over each partition. For example, as shown in FIG. 9A, which illustrates an example of executing a query over a partition, if a slave is assigned the Q1 partition, this slave may execute 810 the query 110 over the Q1 partition and obtain a set of results (Q1 results). As shown in the additional examples of FIGS. 9B-9D, which continue the example discussed above with regard to FIG. 9A, the query 100 may be similarly executed 810 over the Q2, Q3, and Q4 partitions (e.g., by different slave processes) to obtain additional sets of results (Q2, Q3, and Q4 results). In the examples of FIG. 9A-9D, the slave processes may execute 810 the query 110 in parallel over the partitions to which they are assigned and return the results back to the query coordinator process, which coordinates the results.

Figure 10A:
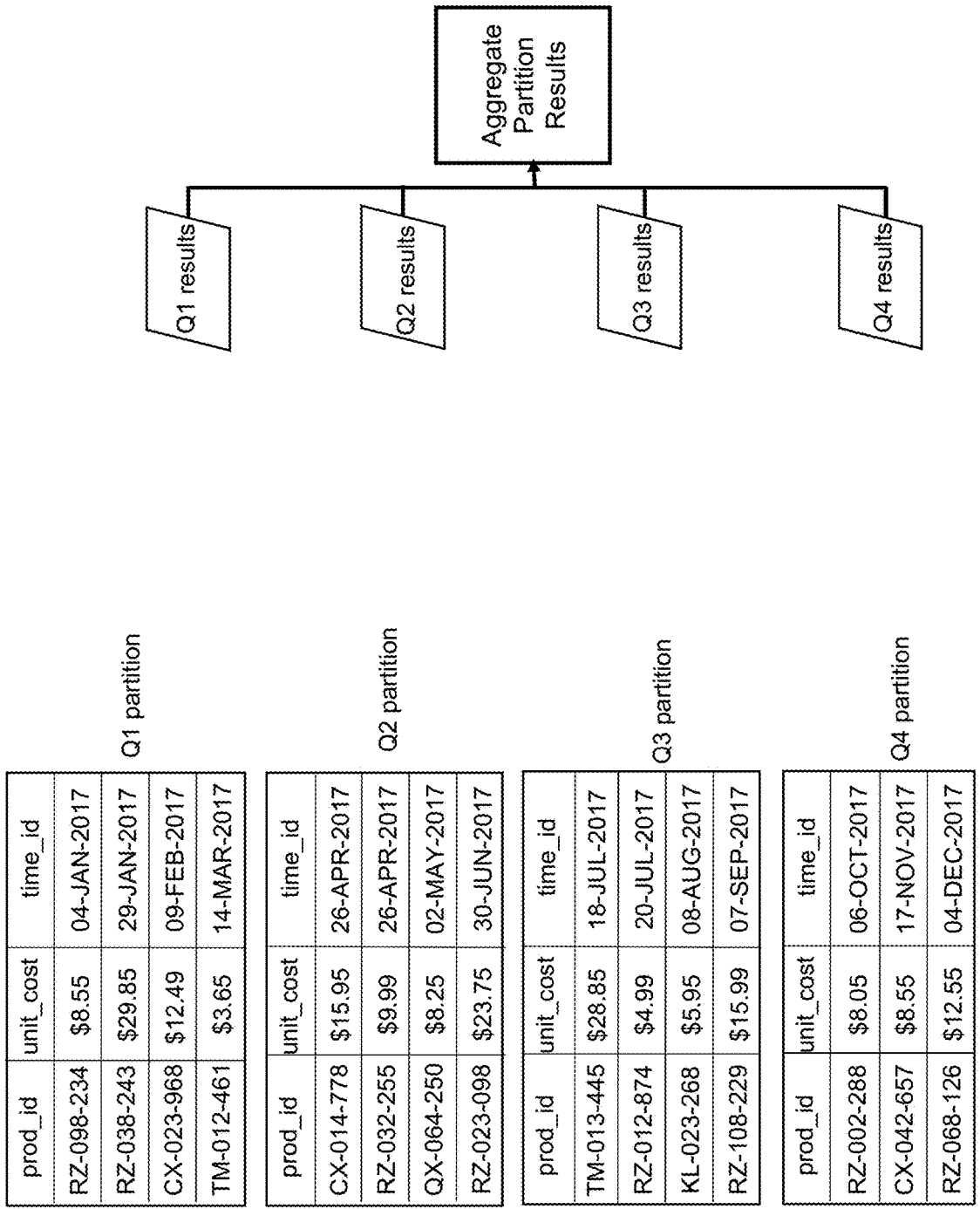
FIGS. 10A-10B illustrate an example of aggregating results of executing a query over multiple partitions according to some embodiments of the invention.
Figure 10B:
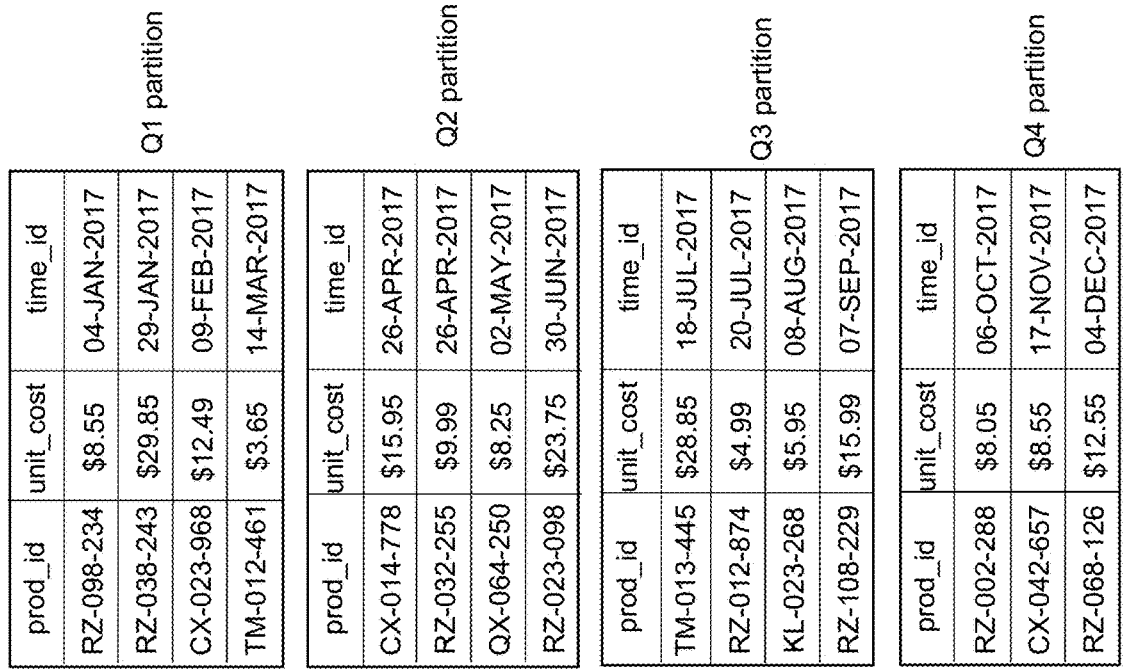

Referring back to FIG. 8, depending on the execution plan 140 generated 330 by the optimizer 130, additional steps may be required to be performed in order for the query 110 to be executed 335 based on the execution plan 140. In embodiments in which the optimizer 130 generates 530 an execution plan 140 to perform partition-wise execution of the query 110 without aggregating results of each partition, executing 335 the query 110 based on the execution plan 140 does not include step 815. For example, if a query coordinator process assigns 805 each partition to a different slave process, once the slave processes have executed 810 the query 110 and returned the results back to the query coordinator process, the query coordinator process may send the results for each partition back to a client 105 from which the query 110 originated. However, in embodiments in which the optimizer 130 generates 535 an execution plan 140 to perform partition-wise execution and aggregates results for each partition after executing the query 110 in a partition-wise manner, executing 335 the query 110 requires aggregating 815 the results for each partition. In the above example, once the query coordinator process has received the results for each partition from the slave processes, the query coordinator may aggregate 815 the partition results to obtain a set of aggregated results, as shown in FIGS. 10A-10B, which illustrate an example of aggregating results of executing a query over multiple partitions.

To provide additional examples of how to implement function semantic based partition-wise SQL execution, FIGS. 11A-11B are example tables used to generate an execution plan to execute a query in a partition-wise manner without aggregating results of each partition and FIG. 11C is an example table used to generate an execution plan to execute a query in a partition-wise manner and to aggregate results of each partition based on semantics of a function of the query according to some embodiments of the invention.

Referring first to FIG. 11A, suppose that a table is range-partitioned by date over a column named "time_id," such that each partition corresponds to a range of one month, in which a range partition definition associated with a first partition (P1) corresponds to a VALUES LESS THAN 1 Feb. 2017 clause. In this example, since the first partition includes data having a table partitioning key value ranging from an undefined date to 31 Jan. 2017, the partition analyzer 134 may determine that the low bound of the first partition is undefined and that the high bound of the first partition is 31 Jan. 2017. Continuing with this example, the function analyzer 132 may identify 505 a function called "MONTH" (which extracts the month from a given date) to be a function specified over the operation keys of a query 110 that is also a function over the table partitioning key since the function is included in a window function (e.g., OVER(partition by MONTH(time_id))) of the query 110. In this example, the function analyzer 132 may evaluate the MONTH function on the low bound and the high bound of the first partition and obtain 515 a low value for this partition that is undefined and a high value for this partition that corresponds to the value of "JAN." In this example, the function analyzer 132 may then repeat this process for additional partitions (P2 through P12).

Once the function analyzer 132 has obtained 515 a set of values for each partition of the table, the function analyzer 132 may compare 520 the sets of values for different partitions. In some embodiments, the function analyzer 132 may only compare (520) defined values for different partitions. For example, referring still to FIG. 11A, the function analyzer 132 may compare 520 the high value for the P1 partition (JAN) with the low value and the high value for the P2 partition (FEB and FEB) and repeat this process until the defined values for different partitions have been compared 520 to each other. In some embodiments, the function analyzer 132 may stop comparing 520 the sets of values for different partitions if any values for different partitions match.

The optimizer 130 may generate 330 an execution plan 140 based on whether the function analyzer 132 determines 525 if any values for different partitions match. If the function analyzer 132 determines 525 that none of the values for different partitions match, the optimizer 130 generates 530 an execution plan 140 to perform partition-wise execution of the query 110 without aggregating results of each partition. For example, the function analyzer 132 may determine 525 that none of the values for different partitions match in FIG. 11A. Therefore, as the outcome below the table in FIG. 11A states, the optimizer 130 generates 530 an execution plan 140 to perform partition-wise execution of the query 110 without aggregating results of each partition.

Referring next to FIG. 11B, suppose that a table is range-partitioned by date over a column named "time_id." In this example, the partitions include date ranges of different time spans, such that each partition corresponds to a range of six months or one month. For example, range partition definitions associated with a first partition (S1) and a second partition (S2) correspond to a VALUES LESS THAN 1 Jul. 2016 clause and a VALUES LESS THAN 1 Jan. 2017 clause, respectively, while a range partition definition associated with a third partition (P1) corresponds to a VALUES LESS THAN 1 Feb. 2017 clause. In this example, since the first partition includes rows having a table partitioning key value ranging from an undefined date to 30 Jun. 2016, the partition analyzer 134 may determine that the low bound of the first partition is undefined and that the high bound of the first partition is 30 Jun. 2016. Continuing with this example, the function analyzer 132 may identify a function called "TRUNC," to be specified over the operation key of a query 110, in which the function truncates a portion of a specified field, such as a date, and returns the date truncated to a specific unit of measure (here, MONTH), in which the value returned is of datatype DATE. In this example, the function analyzer 132 may evaluate the TRUNC function on the low bound and the high bound of the first partition, to obtain 515 a low value for this partition that is undefined and a high value for this partition that corresponds to the value of "1 Jun. 2016." In this example, the function analyzer 132 may then repeat this process for additional partitions (e.g., S2 through P6).

Once the function analyzer 132 has obtained 515 a set of values for each partition of a partitioned table, the function analyzer 132 may compare 520 the sets of values for different partitions. In some embodiments, the function analyzer 132 may only compare (520) defined values for different partitions. For example, referring still to FIG. 11B, the function analyzer 132 may compare 520 the high value for the S1 partition (1 Jun. 2016) with the low value and the high value for the S2 partition (1 Jul. 2016 and 1 Dec. 2016) and repeat this process until the low value and the high value for different partitions have been compared 520 to each other. In some embodiments, the function analyzer 132 may stop comparing 520 the sets of values for different partitions if any values for different partitions match.

The optimizer 130 may generate 330 an execution plan 140 based on whether the function analyzer 132 determines 525 if any values for different partitions match. If the function analyzer 132 determines 525 that none of the values associated with different partitions match, the optimizer 130 generates 530 an execution plan 140 to perform partition-wise execution of the query 110 without aggregating results of each partition. For example, the function analyzer 132 may determine 525 that none of the values for different partitions match in FIG. 11B. Therefore, as the outcome below the table in FIG. 11B states, the optimizer 130 generates 530 an execution plan 140 to perform partition-wise execution of the query 110 without aggregating results of each partition.

Referring now to FIG. 11C, suppose that a table is range-partitioned by date over the column "time_id." Similar to the example of FIG. 11B, the partitions include date ranges of different time spans such that each partition corresponds to a range of six months or one month. However, in the example of FIG. 11C, the function analyzer 132 may identify 505 a function called "MONTH," which extracts the month from a given date, to be a function specified over the operation keys of a query 110 that is also a function over the table partitioning key. In this example, the function analyzer 132 may evaluate the MONTH function over the low bound and the high bound of the first partition, to obtain 515 a low value for this partition that is undefined and a high value for this partition that corresponds to the value of "JUN." In this example, the function analyzer 132 may then repeat this process for additional partitions (e.g., S2 through P6).

Once the function analyzer 132 has obtained 515 a set of values for each partition of a partitioned table, the function analyzer 132 may compare 520 the sets of values for different partitions. In some embodiments, the function analyzer 132 may only compare (520) defined values for different partitions. For example, referring still to FIG. 11C, the function analyzer 132 may compare 520 the high value for the S1 partition (JUN) with the low value and the high value for the S2 partition (JUL and DEC) and repeat this process until the low value and the high value for different partitions have been compared 520 to each other. In some embodiments, the function analyzer 132 may stop comparing 520 the sets of values for different partitions upon determining that any values for different partitions match.

The optimizer 130 may generate 330 an execution plan 140 based on whether the function analyzer 132 determines 525 if any values for different partitions match. If the function analyzer 132 determines 525 that any values associated with different partitions match, the optimizer 130 generates 535 an execution plan 140 to perform partition-wise execution and aggregates results for each partition after executing the query 110 in a partition-wise manner. For example, the function analyzer 132 may determine 525 that the high value for partition S1 matches the low value and the high value for partition P6 in FIG. 11C. Therefore, as the outcome below the table in FIG. 11C states, the optimizer 130 generates 535 an execution plan 140 to perform partition-wise execution of the query 110 and aggregates the results of each partition.

Function Semantic Based Partition Pruning

FIG. 12 is a flow chart for determining whether to execute a query in a data processing system with consideration of partition pruning according to some embodiments of the invention. In some embodiments, the steps may be performed in an order different from that described in FIG. 12.

Figure 13A:
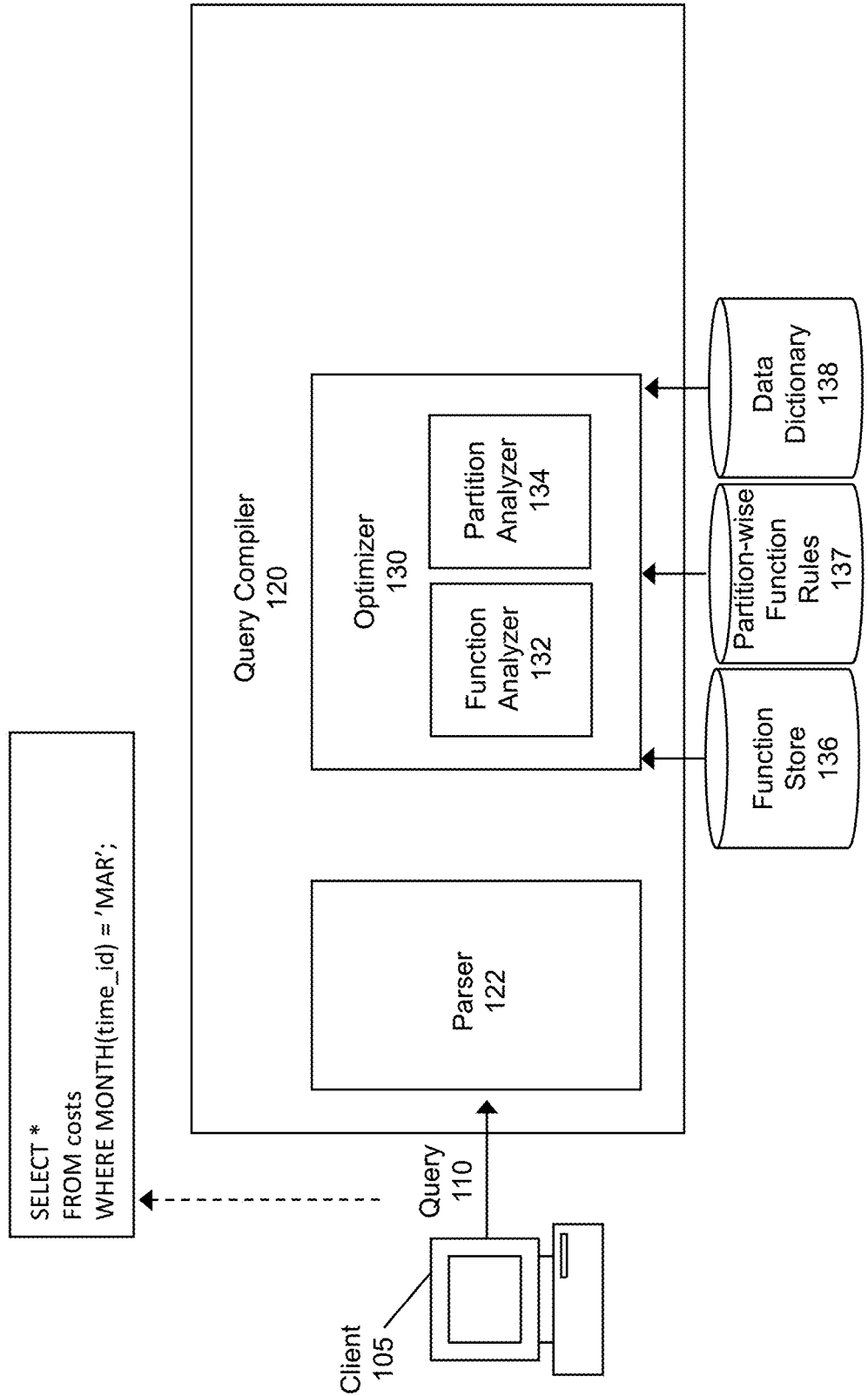

As shown in FIG. 12, the flowchart begins when the query compiler 120 of the data processing system receives 305 a query 110 (e.g., an SQL statement). The statement may be received 305 directly from the client 105 or indirectly from the client 105 (e.g., via a local database server). The query 110 may be directed to one or more tables stored in one or more databases. For example, as shown in FIG. 13A, which illustrates an example of generating an execution plan to execute a query with consideration of partition pruning, suppose the query compiler 120 receives 305 the following query 110 from the client 105:

SELECT*FROM costs WHERE MONTH(time_id)='MAR',"

In this example, "time_id" is a column that corresponds to a table partitioning key used to partition a table named "costs" by range.

Figure 13B:
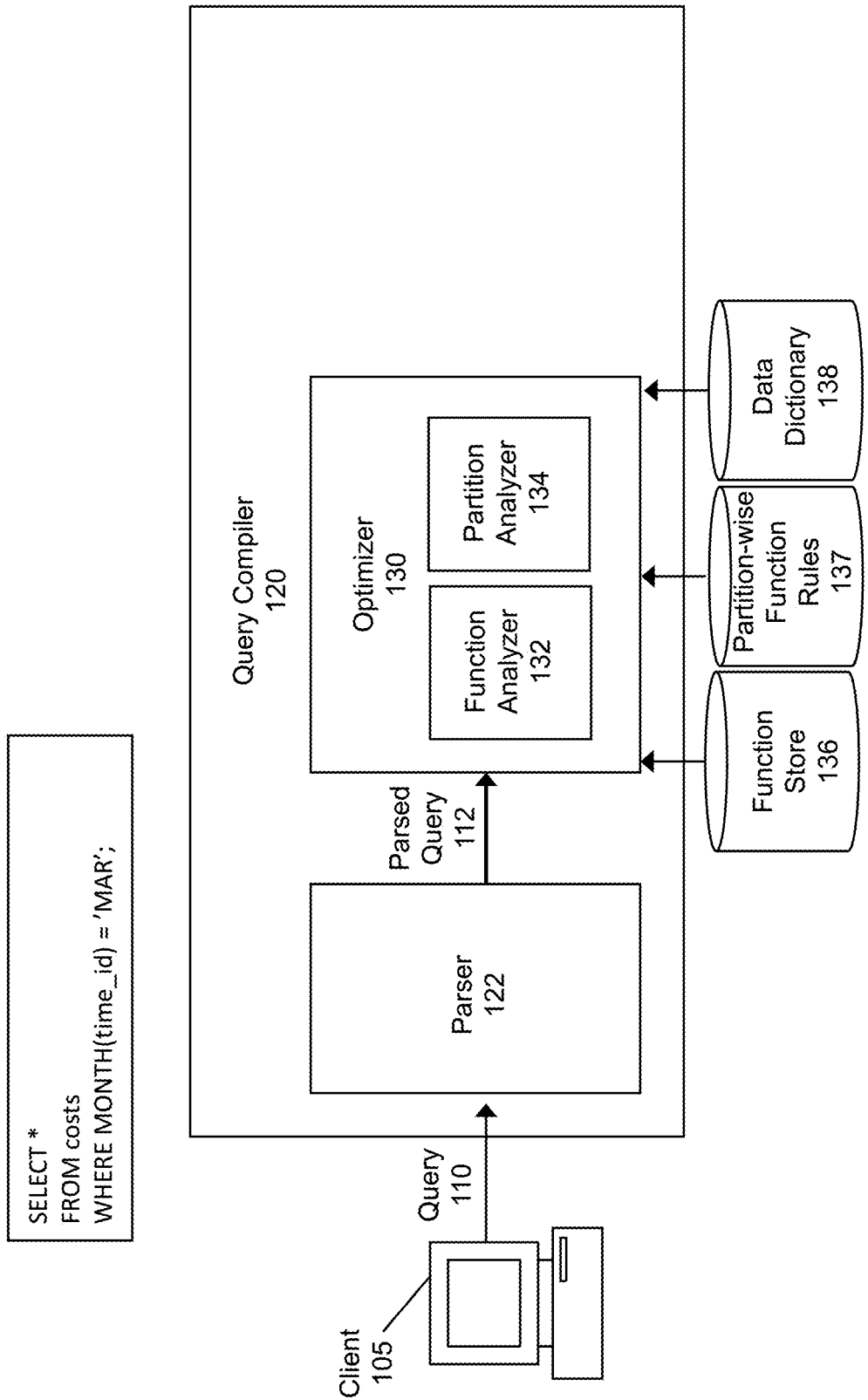

Referring back to FIG. 12, upon receiving 305 the query 110, the parser 122 at the query compiler 120 may perform various checks on the query 110, as described above in conjunction with FIG. 1. In the above example, the parser 122 may perform a syntactic check on the query 110 (e.g., by checking for misspelled keywords) as well as a semantic check (e.g., by making sure that the table named "costs" exists and that the column named "time_id" exists within the costs table). The parser 122 may also check a shared buffer cache to determine whether a version of an execution plan 140 corresponding to the query 110 already exists so that steps performed by the optimizer 130 may be skipped. Once the parser 122 has completed performing the checks on the query 110, the parsed query 112 may be passed to the optimizer 130, as shown in FIG. 13B, which continues the example discussed above with regard to FIG. 13A.

As illustrated in FIG. 12, based on the parsed query 112 received from the parser 122, the optimizer 130 may determine 310 if the query 110 is directed to a range-partitioned table. As described above in conjunction with FIG. 3, the partition analyzer 134 may determine 310 if the query 110 is directed to a range-partitioned table by accessing information stored in the data dictionary 138. In the above example, the partition analyzer 134 may access information stored in the data dictionary 138 to determine whether the costs table is a partitioned table, such as information describing a partitioning strategy used to partition the table (e.g., range partitioning, hash partitioning, and list partitioning). If the partition analyzer 134 determines 310 that the query 110 is not directed to a range-partitioned table, the data processing system will not perform 1005 partition pruning to execute the query 110. Conversely, if the partition analyzer 134 determines 310 that the query 110 is directed to a range-partitioned table, the optimizer 130 may determine 1000 if correlations exist between functions included in a predicate of the query 110 and values corresponding to the partitions. In various embodiments, similar techniques may be applied to tables that are partitioned according to other types of partitioning techniques (e.g., hash partitioning and list partitioning).

Figure 13C:
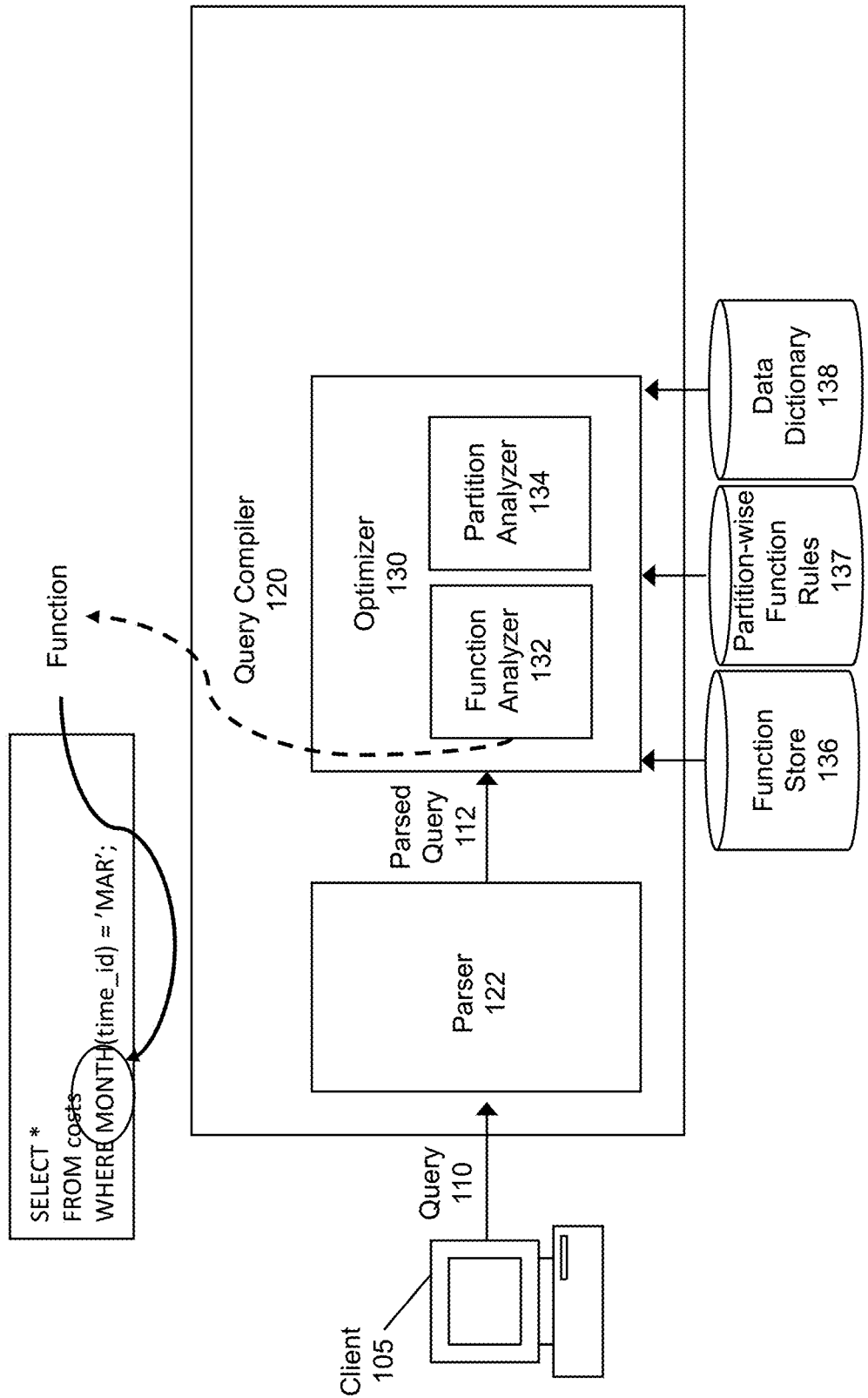

The function analyzer 132 may determine 1000 if any correlations exist between each function included in a predicate of the query 110 and values corresponding to the partitions. The function analyzer 132 may do so by first identifying the function(s) based on information stored in the function store 136. For example, as shown in FIG. 13C, which continues the example discussed above with regard to FIGS. 13A and 13B, the function analyzer 132 accesses the function store 136 and identifies the MONTH function as a user-defined function. In this example, the function analyzer 132 may also determine that the MONTH function is included in a predicate and that the MONTH function is a function over the table partitioning key since the WHERE clause specifies syntax including the MONTH function, the MONTH function is a function over the time_id column, and the time_id column corresponds to the table partitioning key. Then, the function analyzer 132 may determine 1000 whether any correlations exist between the function and values corresponding to the partitions.

As shown in FIG. 13D, which continues the example discussed above with regard to FIGS. 9A-9C, the function analyzer 132 may determine 1000 whether any correlations exist between the function and values corresponding to the partitions by evaluating the MONTH function on the high bound and the low bound of each partition to obtain a high value and a low value, respectively. In this example, each partition corresponds to a range of three months, in which a range partition definition associated with a first partition corresponds to a VALUES LESS THAN 1 Apr. 2017 clause. In this example, since the first partition includes rows having a table partitioning key value ranging from an undefined date to 31 Mar. 2017, the partition analyzer 134 may determine that the low bound of the first partition is undefined and that the high bound of the first partition is 31 Mar. 2017. Continuing with this example, if the function analyzer 132 evaluates the MONTH function (which extracts the month from a given date) on the low bound and the high bound of the first partition, the function analyzer will obtain a low value for this partition corresponding to an undefined value and a high value for this partition corresponding to the value of "MAR." In this example, the function analyzer 132 may then repeat this process for each additional partition. The function analyzer 132 may then compare the set of values associated with each partition with each function included in the predicate of the query 110 and determine 1000 whether any correlations exist between the function and the values corresponding to the partitions. In the example of FIG. 13D, there is a correlation between the function included in the predicate (MONTH(time_id)='MAR') and the high value for the first partition (MAR).

Figure 13E:
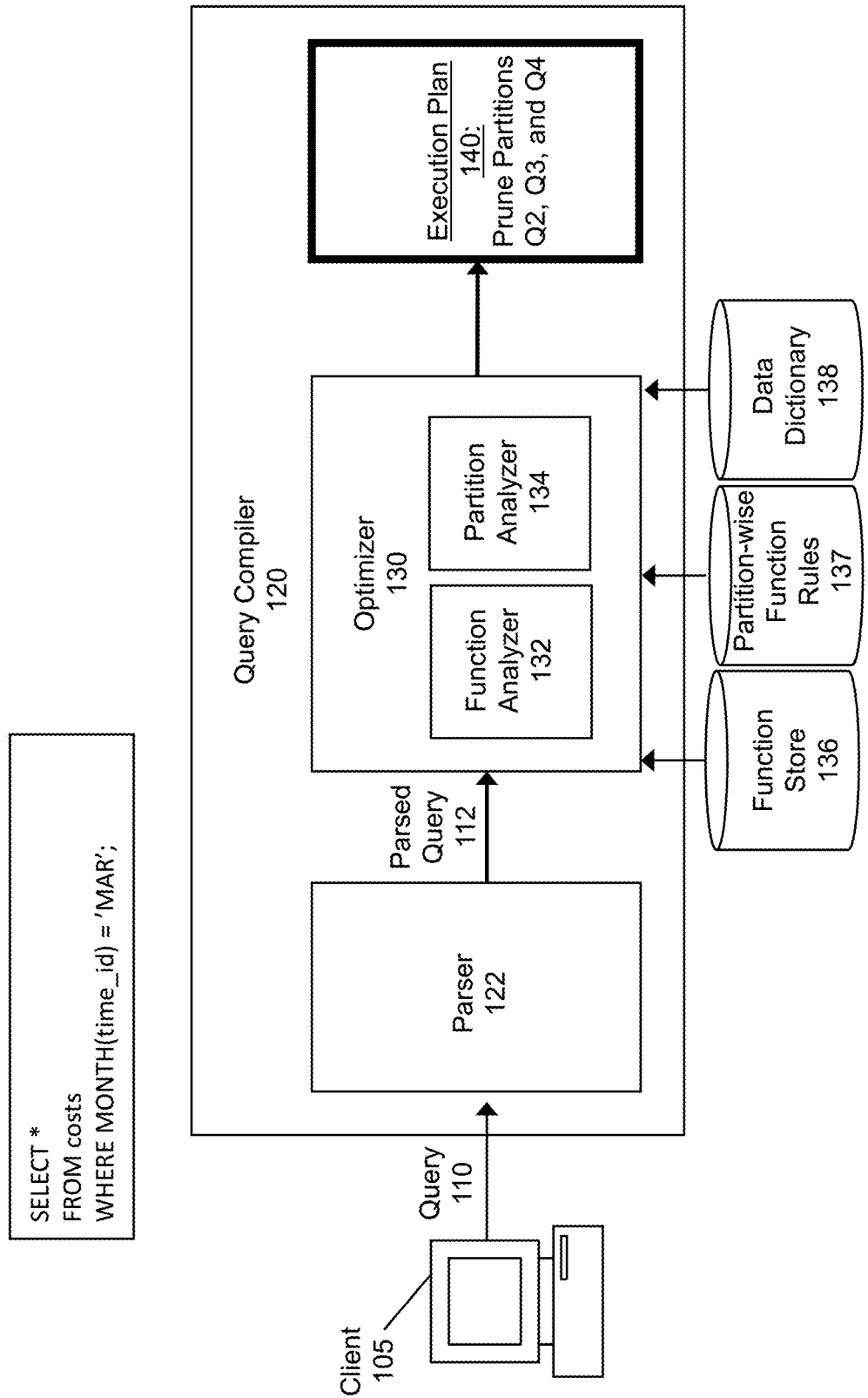

Referring again to FIG. 12, depending on whether any correlations exist between each function included in the predicate of the query 110 and the values corresponding to the partitions, the optimizer 130 may generate 1010 an execution plan 140 with consideration of partition pruning. In embodiments in which no correlations exist between each function included in the predicate of the query 110 and the values corresponding to the partitions, the execution plan 140 may not involve partition pruning. However, in embodiments in which any correlations exist between each function included in the predicate of the query 110 and the values corresponding to the partitions, the execution plan 140 may involve pruning one or more partitions. As shown in the example of FIG. 13E, which continues the example discussed with respect to FIGS. 13A-13D, since there is a correlation between the function included in the predicate (MONTH(time_id)='MAR') and the high value for the first partition (MAR), the execution plan 140 generated 1010 by the optimizer 130 involves pruning partitions Q2, Q3, and Q4.

Figure 14B:
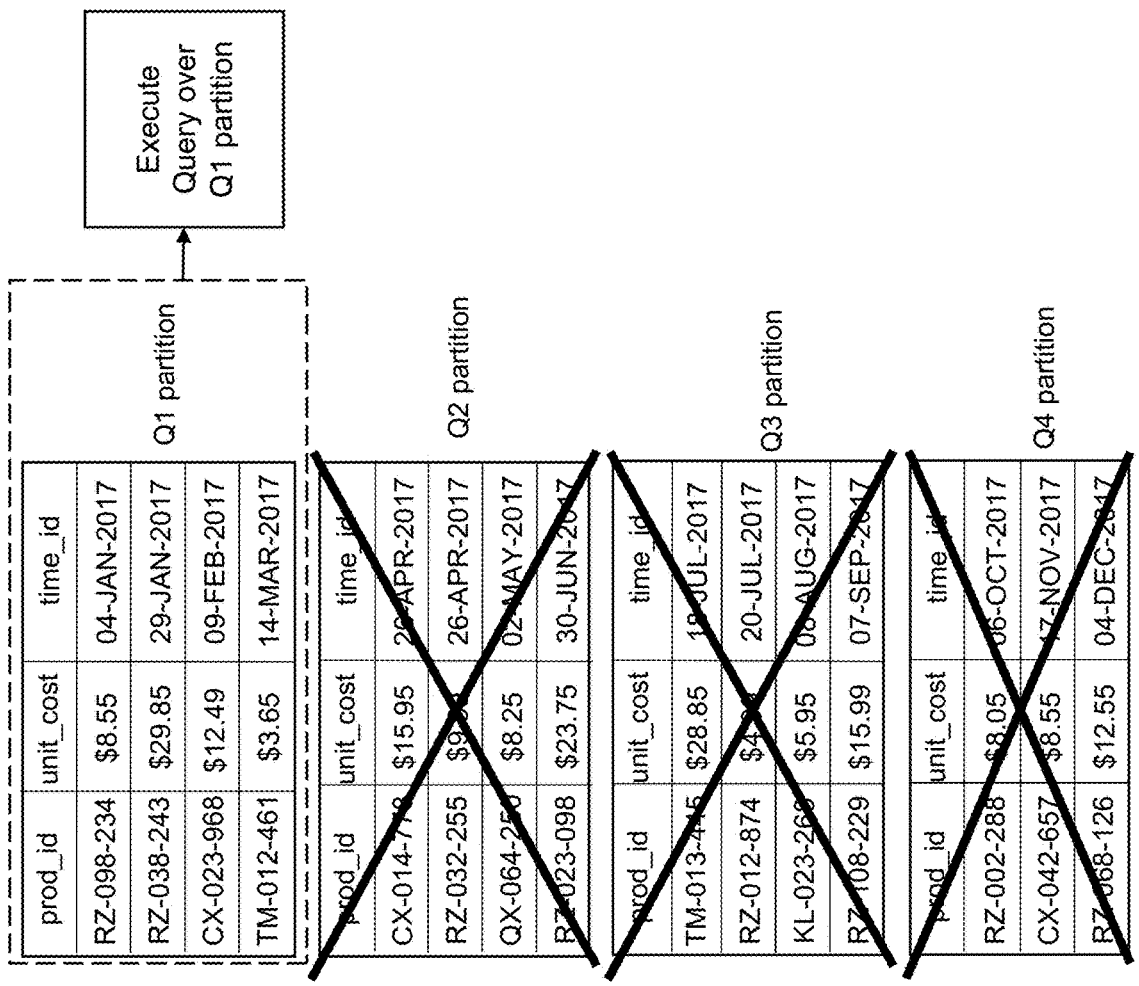
FIGS. 14B-14C illustrate an example of executing a query over an unpruned partition of a partitioned table according to some embodiments of the invention.
Figure 14C:
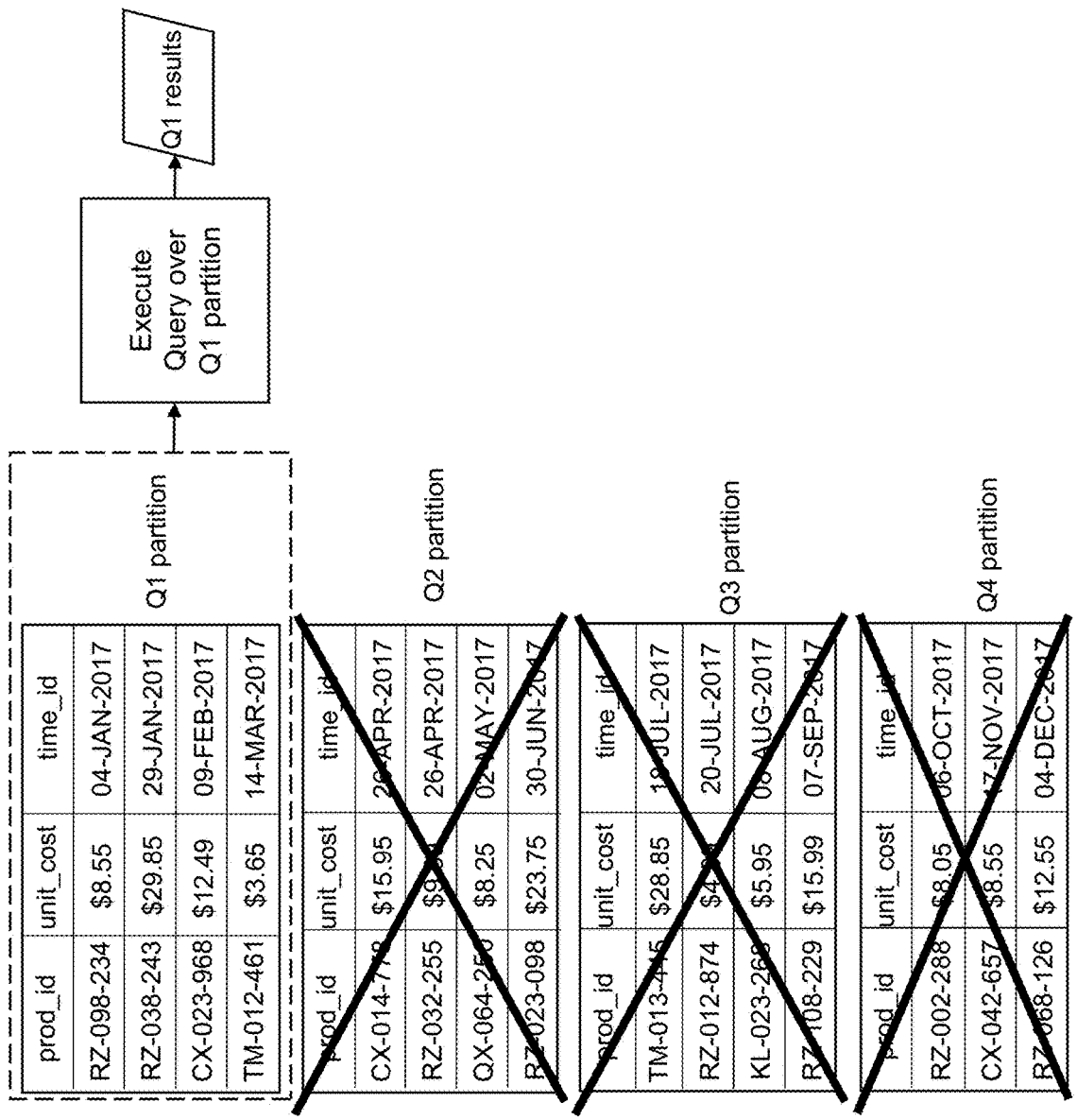

Referring once more to FIG. 12, the query 110 may be executed 1015 based on the execution plan 140 (e.g., by an SQL engine of the data processing system). For example, if the optimizer 130 generates 1010 an execution plan 140 that does not require pruning of any partitions, execution of the query 110 may proceed to executing 1015 the query 110 over each partition and/or aggregating the results for each partition after executing the query 110 in a partition-wise manner. Alternatively, in the above example, if the optimizer 130 generates 1010 an execution plan 140 that requires pruning any partitions, the partitions may be pruned from processing. For example, since the execution plan 140 generated 1010 by the optimizer 130 in FIG. 13E involved pruning the Q2, Q3, and Q4, partitions, these partitions are pruned from processing, as shown in FIG. 14A. Then, as shown in FIG. 14B, after these partitions have been pruned, the query 110 is executed 1015 over the Q1 partition, and the results for this partition are obtained, as shown in FIG. 14C.

System Architecture

Figure 15:
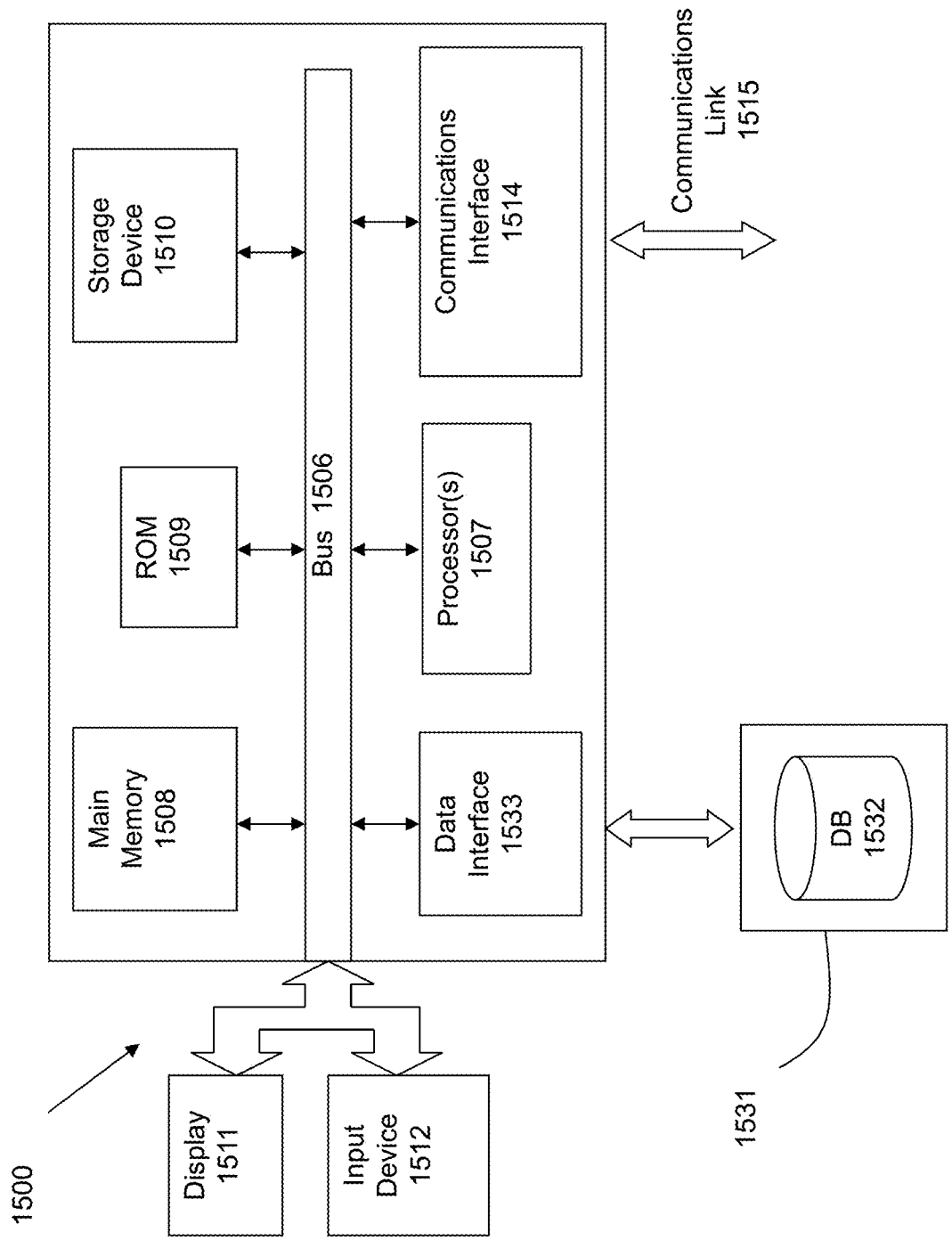
FIG. 15 is a block diagram of a computing system suitable for implementing an embodiment of the present invention.

FIG. 15 is a block diagram of an illustrative computing system 1500 suitable for implementing an embodiment of the present invention. Computer system 1500 includes a bus 1506 or other communication mechanism for communicating information, which interconnects subsystems and devices, such as processor 1507, system memory 1508 (e.g., RAM), static storage device 1509 (e.g., ROM), disk drive 1510 (e.g., magnetic or optical), communication interface 1514 (e.g., modem or Ethernet card), display 1511 (e.g., CRT or LCD), input device 1512 (e.g., keyboard), and cursor control.

According to some embodiments of the invention, computer system 1500 performs specific operations by processor 1507 executing one or more sequences of one or more instructions contained in system memory 1508. Such instructions may be read into system memory 1508 from another computer readable/usable medium, such as static storage device 1509 or disk drive 1510. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1507 for execution. Such a medium may take many forms, including but not limited to, non-volatile media and volatile media. Non-volatile media includes, for example, optical or magnetic disks, such as disk drive 1510. Volatile media includes dynamic memory, such as system memory 1508.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1500. According to other embodiments of the invention, two or more computer systems 1500 coupled by communication link 1510 (e.g., LAN, PTSN, or wireless network) may perform the sequence of instructions required to practice the invention in coordination with one another.

Computer system 1500 may transmit and receive messages, data, and instructions, including program, i.e., application code, through communication link 1515 and communication interface 1514. Received program code may be executed by processor 1507 as it is received, and/or stored in disk drive 1510, or other non-volatile storage for later execution. A database 1532 in a storage medium 1531 may be used to store data accessible by the system 1500.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 16:
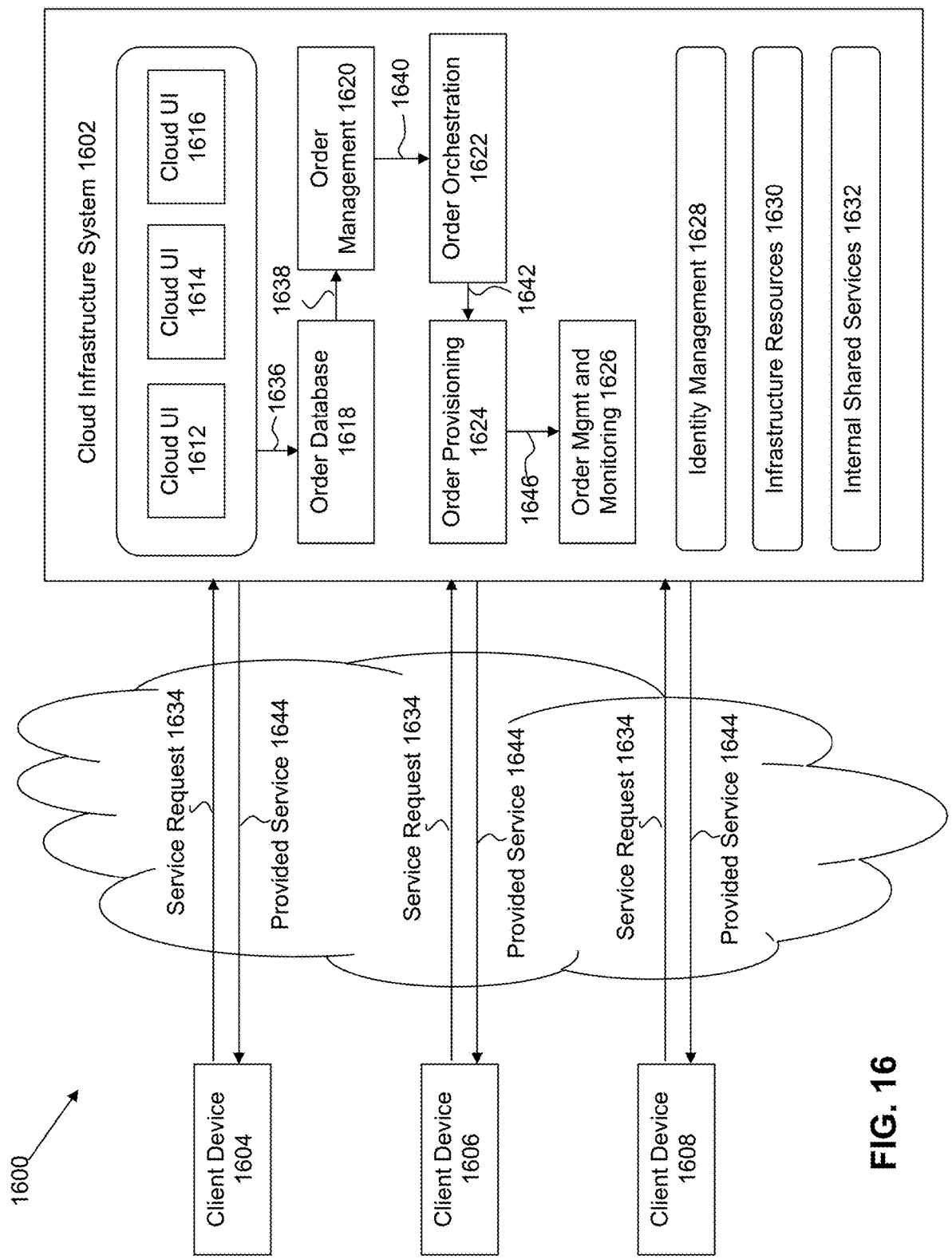
FIG. 16 is a block diagram of one or more components of a system environment by which services provided by one or more components of an embodiment system may be offered as cloud services, in accordance with an embodiment of the present disclosure.

FIG. 16 is a simplified block diagram of one or more components of a system environment 1600 by which services provided by one or more components of an embodiment system may be offered as cloud services, in accordance with an embodiment of the present disclosure. In the illustrated embodiment, system environment 1600 includes one or more client computing devices 1604, 1606, and 1608 that may be used by users to interact with a cloud infrastructure system 1602 that provides cloud services. The client computing devices may be configured to operate a client application such as a web browser, a proprietary client application, or some other application, which may be used by a user of the client computing device to interact with cloud infrastructure system 1602 to use services provided by cloud infrastructure system 1602.

It should be appreciated that cloud infrastructure system 1602 depicted in the figure may have other components than those depicted. Further, the embodiment shown in the figure is only one example of a cloud infrastructure system that may incorporate an embodiment of the invention. In some other embodiments, cloud infrastructure system 1602 may have more or fewer components than shown in the figure, may combine two or more components, or may have a different configuration or arrangement of components. Client computing devices 1604, 1606, and 1608 may be devices similar to those described above for FIG. 6. Although system environment 1600 is shown with three client computing devices, any number of client computing devices may be supported. Other devices such as devices with sensors, etc. may interact with cloud infrastructure system 1602.

Network(s) 1610 may facilitate communications and exchange of data between clients 1604, 1606, and 1608 and cloud infrastructure system 1602. Each network may be any type of network familiar to those skilled in the art that can support data communications using any of a variety of commercially-available protocols. Cloud infrastructure system 1602 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1602 may include a suite of applications, middleware, and database service offerings that are delivered to a customer in a self-service, subscription-based, elastically scalable, reliable, highly available, and secure manner.

In various embodiments, cloud infrastructure system 1602 may be adapted to automatically provision, manage and track a customer's subscription to services offered by cloud infrastructure system 1602. Cloud infrastructure system 1602 may provide the cloudservices via different deployment models. For example, services may be provided under a public cloud model in which cloud infrastructure system 1602 is owned by an organization selling cloud services and the services are made available to the general public or different industry enterprises. As another example, services may be provided under a private cloud model in which cloud infrastructure system 1602 is operated solely for a single organization and may provide services for one or more entities within the organization. The cloud services may also be provided under a community cloud model in which cloud infrastructure system 1602 and the services provided by cloud infrastructure system 1602 are shared by several organizations in a related community. The cloud services may also be provided under a hybrid cloud model, which is a combination of two or more different models.

In some embodiments, the services provided by cloud infrastructure system 1602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1602. Cloud infrastructure system 1602 then performs processing to provide the services in the customer's subscription order.

In some embodiments, the services provided by cloud infrastructure system 1602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1602 may also include infrastructure resources 1630 for providing the resources used to provide various services to customers of the cloud infrastructure system. In one embodiment, infrastructure resources 1630 may include pre-integrated and optimized combinations of hardware, such as servers, storage, and networking resources to execute the services provided by the PaaS platform and the SaaS platform.

In some embodiments, resources in cloud infrastructure system 1602 may be shared by multiple users and dynamically re-allocated per demand. Additionally, resources may be allocated to users in different time zones. For example, cloud infrastructure system 1602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1632 may be provided that are shared by different components or modules of cloud infrastructure system 1602 and by the services provided by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1602, and the like.

In one embodiment, as depicted in the figure, cloud management functionality may be provided by one or more modules, such as an order management module 1620, an order orchestration module 1622, an order provisioning module 1624, an order management and monitoring module 1626, and an identity management module 1628. These modules may include or be provided using one or more computers and/or servers, which may be general purpose computers, specialized server computers, server farms, server clusters, or any other appropriate arrangement and/or combination.

In operation 1634, a customer using a client device, such as client device 1604, 1606 or 1608, may interact with cloud infrastructure system 1602 by requesting one or more services provided by cloud infrastructure system 1602 and placing an order for a subscription for one or more services offered by cloud infrastructure system 1602. In certain embodiments, the customer may access a cloud User Interface (UI), cloud UI 1612, cloud UI 1614 and/or cloud UI 1616 and place a subscription order via these UIs. The order information received by cloud infrastructure system 1602 in response to the customer placing an order may include information identifying the customer and one or more services offered by the cloud infrastructure system 1602 that the customer intends to subscribe to.

After an order has been placed by the customer, the order information is received via the cloud UIs, 1612, 1614 and/or 1616. At operation 1636, the order is stored in order database 1618. Order database 1618 can be one of several databases operated by cloud infrastructure system 1618 and operated in conjunction with other system elements. At operation 1638, the order information is forwarded to an order management module 1620. In some instances, order management module 1620 may be configured to perform billing and accounting functions related to the order, such as verifying the order, and upon verification, booking the order. At operation 1640, information regarding the order is communicated to an order orchestration module 1622. Order orchestration module 1622 may utilize the order information to orchestrate the provisioning of services and resources for the order placed by the customer. In some instances, order orchestration module 1622 may orchestrate the provisioning of resources to support the subscribed services using the services of order provisioning module 1624.

In certain embodiments, order orchestration module 1622 enables the management of business processes associated with each order and applies business logic to determine whether an order should proceed to provisioning. At operation 1642, upon receiving an order for a new subscription, order orchestration module 1622 sends a request to order provisioning module 1624 to allocate resources and configure those resources needed to fulfill the subscription order. Order provisioning module 1624 enables the allocation of resources for the services ordered by the customer. Order provisioning module 1624 provides a level of abstraction between the cloud services provided by cloud infrastructure system 1602 and the physical implementation layer that is used to provision the resources for providing the requested services. Order orchestration module 1622 may thus be isolated from implementation details, such as whether or not services and resources are actually provisioned on the fly or pre-provisioned and only allocated/assigned upon request.

At operation 1644, once the services and resources are provisioned, a notification of the provided service may be sent to customers on client devices 1604, 1606 and/or 1608 by order provisioning module 1624 of cloud infrastructure system 1602.

At operation 1646, the customer's subscription order may be managed and tracked by an order management and monitoring module 1626. In some instances, order management and monitoring module 1626 may be configured to collect usage statistics for the services in the subscription order, such as the amount of storage used, the amount data transferred, the number of users, and the amount of system up time and system down time.

In certain embodiments, cloud infrastructure system 1602 may include an identity management module 1628. Identity management module 1628 may be configured to provide identity services, such as access management and authorization services in cloud infrastructure system 1602. In some embodiments, identity management module 1628 may control information about customers who wish to utilize the services provided by cloud infrastructure system 1602. Such information can include information that authenticates the identities of such customers and information that describes which actions those customers are authorized to perform relative to various system resources (e.g., files, directories, applications, communication ports, memory segments, etc.) Identity management module 1628 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for processing a request to perform an operation directed to a partitioned table that has been range-partitioned into a plurality of partitions based at least in part upon a table partitioning key, the partitioned table comprising a column corresponding to the table partitioning key, the method comprising:
   receiving a query directed to the partitioned table, wherein the query corresponds to a format that comprises:
      a first keyword comprising a SELECT, INSERT, UPDATE, DELETE, or MERGE clause;
      a first operation key that follows the first keyword;
      a FROM keyword that follows the first operation key;
      an identification of the partitioned table that follows the FROM keyword;
      a second keyword that follows the identification of the partitioned table, wherein the second keyword comprises a GROUP BY or WHERE clause; and
      a second operation key that comprises a function and follows the second keyword, wherein the function comprises a built-in SQL function or a user-defined function, and the function receives the table partitioning key or a column identification corresponding to the table partitioning key as an input argument;

determining whether the query can be executed using partition-wise execution based on at least whether the function, when invoked, executes over the table partitioning key or a column that corresponds to the table partitioning key; and executing, in response to a determination that the query can be executed using partition-wise execution, the query over the partitioned table using the partition-wise execution, wherein the partition-wise execution comprises executing the query on a partition-by-partition basis.

2. The method of claim 1, further comprising analyzing the function over the column that corresponds to the table partitioning key to determine partition boundaries by:

obtaining a first set of values corresponding to a first partition of the plurality of partitions by evaluating the function on at least one of a first low bound value or a first high bound value stored in the column corresponding to the table partitioning key for the first partition;

obtaining a second set of values corresponding to a second partition of the plurality of partitions by evaluating the function on at least one of a second low bound value or a second high bound value stored in the column corresponding to the table partitioning key for the second partition; and determining whether to aggregate query execution results obtained by executing the query over the partitioned table using the partition-wise execution based at least in part on a comparison of the first set of values corresponding to the first partition with the second set of values corresponding to the second partition.

3. The method of claim 2, wherein it is determined that the query execution results are to be aggregated when any of the first set of values match any of the second set of values.

4. The method of claim 2, wherein it is determined that the query execution results are not to be aggregated when none of the first set of values match any of the second set of values.

5. The method of claim 1, wherein the table partitioning key comprises a date.

6. The method of claim 1, wherein the function executes over a superset of the table partitioning key.

7. The method of claim 1, wherein a bound of a first partition of the plurality of partitions is undefined after providing one or more values in the column that corresponds to the table partitioning key to the function for evaluation.

8. The method of claim 5, wherein at least some of the plurality of partitions do not correspond to an equal time span.

9. The method of claim 1, wherein executing the query over the partitioned table using the partition-wise execution comprises:

assigning different partitions of the plurality of partitions to different slave processes that execute the query over any assigned partitions.

10. The method of claim 1, wherein the first operation key and the second operation key comprise matching functions.

11. The method of claim 1, wherein the function extracts and returns a portion of a specified field in the column corresponding to the table partitioning key.

12. The method of claim 1, further comprising:

determining a reduced number of partitions from the plurality of partitions that satisfy the query at least by evaluating a predicate in the query directed towards the partitioned table.

13. A non-transitory computer readable medium having stored thereon a sequence of instructions which, when executed by a processor, causes a set of acts for processing a request to perform an operation directed to a partitioned table that has been range-partitioned into a plurality of partitions based at least in part upon a table partitioning key, the partitioned table comprising a column corresponding to the table partitioning key, the set of acts comprising:

receiving a query directed to the partitioned table, wherein the query corresponds to a format that comprises:

a first keyword comprising a SELECT, INSERT, UPDATE, DELETE, or MERGE clause;

a first operation key that follows the first keyword;

a FROM keyword that follows the first operation key;

an identification of the partitioned table that follows the FROM keyword;

a second keyword that follows the identification of the partitioned table, wherein the second keyword comprises a GROUP BY or WHERE clause; and a second operation key that comprises a function and follows the second keyword, wherein the function comprises a built-in SQL function or a user-defined function, and the function receives the table partitioning key or a column identification corresponding to the table partitioning key as an input argument;

determining whether the query can be executed using partition-wise execution based on at least whether the function, when invoked, executes over the table partitioning key or a column that corresponds to the table partitioning key; and executing, in response to a determination that the query can be executed using partition-wise execution, the query over the partitioned table using the partition-wise execution, wherein the partition-wise execution comprises executing the query on a partition-by-partition basis.

14. The non-transitory computer readable medium of claim 13, wherein the set of acts further comprising analyzing the function over the column that corresponds to the table partitioning key to determine partition boundaries by:

obtaining a first set of values corresponding to a first partition of the plurality of partitions by evaluating the function on at least one of a first low bound value or a first high bound value stored in the column corresponding to the table partitioning key for the first partition;

obtaining a second set of values corresponding to a second partition of the plurality of partitions by evaluating the function on at least one of a second low bound value or a second high bound value stored in the column corresponding to the table partitioning key for the second partition; and determining whether to aggregate query execution results obtained by executing the query over the partitioned table using the partition-wise execution based at least in part on a comparison of the first set of values corresponding to the first partition with the second set of values corresponding to the second partition.

15. The non-transitory computer readable medium of claim 14, wherein it is determined that the query execution results are to be aggregated when any of the first set of values match any of the second set of values.

16. The non-transitory computer readable medium of claim 14, wherein it is determined that the query execution results are not to be aggregated when none of the first set of values match any of the second set of values.

17. The non-transitory computer readable medium of claim 13, wherein the table partitioning key comprises a date.

18. The non-transitory computer readable medium of claim 13, wherein the function executes over a superset of the table partitioning key.

19. The non-transitory computer readable medium of claim 13, wherein a bound of a first partition of the plurality of partitions is undefined after providing one or more values in the column that corresponds to the table partitioning key to the function for evaluation.

20. The non-transitory computer readable medium of claim 17, wherein at least some of the plurality of partitions do not correspond to an equal time span.

21. The non-transitory computer readable medium of claim 13, wherein executing the query over the partitioned table using the partition-wise execution comprises:
    assigning different partitions of the plurality of partitions to different slave processes that execute the query over any assigned partitions.

22. The non-transitory computer readable medium of claim 13, wherein the first operation key and the second operation key comprise matching functions.

23. The non-transitory computer readable medium of claim 13, wherein the function extracts and returns a portion of a specified field in the column corresponding to the table partitioning key.

24. The non-transitory computer readable medium of claim 13, wherein the set of acts further comprise:
    determining a reduced number of partitions from the plurality of partitions that satisfy the query at least by evaluating a predicate in the query directed towards the partitioned table.

25. A computer system for processing a request to perform an operation directed to a ranged-partitioned table that has been partitioned into a plurality of partitions based at least in part upon a table partitioning key, the partitioned table comprising a column corresponding to the table partitioning key, comprising:
    a memory for storing instructions; and
    a processor that executes the instructions which to cause a set of acts, the set of acts comprising:
        receiving a query directed to the partitioned table, wherein
            the query corresponds to a format that comprises:
                a first keyword comprising a SELECT, INSERT, UPDATE, DELETE, or MERGE clause;
                a first operation key that follows the first keyword;
                a FROM keyword that follows the first operation key;
                an identification of the partitioned table that follows the FROM keyword;
                a second keyword that follows the identification of the partitioned table, wherein the second keyword comprises a GROUP BY or WHERE clause; and
                a second operation key that comprises a function and follows the second keyword, wherein the function comprises a built-in SQL function or a user-defined function, and the function receives the table partitioning key or a column identification corresponding to the table partitioning key as an input argument;
        determining whether the query can be executed using partition-wise execution based on at least whether the function, when invoked, executes over the table partitioning key or a column that corresponds to the table partitioning key; and
        executing, in response to a determination that the query can be executed using partition-wise execution, the query over the partitioned table using the partition-wise execution, wherein the partition-wise execution comprises executing the query on a partition-by-partition basis.

26. The computer system of claim 25, wherein the set of acts further comprising analyzing the function over the column that corresponds to the table partitioning key to determine partition boundaries by:
    obtaining a first set of values corresponding to a first partition of the plurality of partitions by evaluating the function on at least one of a first low bound value or a first high bound value stored in the column corresponding to the table partitioning key for the first partition;
    obtaining a second set of values corresponding to a second partition of the plurality of partitions by evaluating the function on at least one of a second low bound value or a second high bound value stored in the column corresponding to the table partitioning key for the second partition; and
    determining whether to aggregate query execution results obtained by executing the query over the partitioned table using the partition-wise execution based at least in part on a comparison of the first set of values corresponding to the first partition with the second set of values corresponding to the second partition.

27. The computer system of claim 26, wherein it is determined that the query execution results are to be aggregated when any of the first set of values match any of the second set of values.

28. The computer system of claim 26, wherein it is determined that the query execution results are not to be aggregated when none of the first set of values match any of the second set of values.

29. The computer system of claim 25, wherein the table partitioning key comprises a date.

30. The computer system of claim 25, wherein the function executes over a superset of the table partitioning key.

31. The computer system of claim 29, wherein at least some of the plurality of partitions do not correspond to an equal time span.

32. The computer system of claim 25, wherein executing the query over the partitioned table using the partition-wise execution comprises:
    assigning different partitions of the plurality of partitions to different slave processes that execute the query over any assigned partitions.

33. The computer system of claim 25, wherein the first operation key and the second operation key comprise matching functions.

34. The computer system of claim 25, wherein the function extracts and returns a portion of a specified field in the column corresponding to the table partitioning key.

35. The computer system of claim 25, wherein the set of acts further comprise:
    determining a reduced number of partitions from the plurality of partitions that satisfy the query at least by evaluating a predicate in the query directed towards the partitioned table.

36. A non-transitory computer readable medium having stored thereon a sequence of instructions which, when executed by a processor, causes the processor to execute a set of acts for processing a request to perform an operation directed to a partitioned table that has been range-partitioned into a plurality of partitions based at least in part upon a table partitioning key, the set of acts comprising:

receiving a query directed to the partitioned table, wherein the partitioned table comprises the plurality of partitions and a column corresponding to the table partitioning key, the query corresponds to a format that comprises:
- a first keyword comprising a SELECT, INSERT, UPDATE, DELETE, or MERGE clause;
- a first operation key that follows the first keyword;
- a FROM keyword that follows the first operation key;
- an identification of the partitioned table that follows the FROM keyword;
- a GROUP BY or WHERE clause that follows the identification of the partitioned table; and
- a predicate which follows the GROUP BY or WHERE clause and includes a second operation key which comprises a function, wherein the function comprises a built-in SQL function or a user-defined function, and the function receives the table partitioning key or a column corresponding to the table partitioning key as an input argument;

determining whether the query can be executed using partition-wise execution based on at least whether the function, when invoked, executes over the table partitioning key or a column that corresponds to the table partitioning key; and executing, in response to a determination that the query can be executed using partition-wise execution wherein the partition-wise execution comprises executing the query on a partition-by-partition basis, the query over the partitioned table at least by:
- evaluating the function in the predicate over one or more values in the column that corresponds to the table partitioning key; and
- pruning at least one partition from the plurality of partitions for the query based at least in part upon a result of evaluating the function over the one or more values in the column for the table partitioning key.

37. The non-transitory computer readable medium of claim 36, wherein the set of acts further comprising analyzing the function over the column that corresponds to the table partitioning key to determine partition boundaries by:
obtaining a first set of values corresponding to a first partition of the plurality of partitions by evaluating the function on at least one of a first low bound value or a first high bound value stored in the column corresponding to the table partitioning key for the first partition;
obtaining a second set of values corresponding to a second partition of the plurality of partitions by evaluating the function on at least one of a second low bound value or a second high bound value stored in the column corresponding to the table partitioning key for the second partition; and
determining whether to aggregate query execution results obtained by executing the query over the partitioned table using the partition-wise execution based at least in part on a comparison of the first set of values corresponding to the first partition with the second set of values corresponding to the second partition.

38. The non-transitory computer readable medium of claim 37, wherein it is determined that the query execution results are to be aggregated when any of the first set of values match any of the second set of values.

39. The non-transitory computer readable medium of claim 37, wherein it is determined that the query execution results are not to be aggregated when none of the first set of values match any of the second set of values.

40. The non-transitory computer readable medium of claim 36, wherein a bound of a first partition of the plurality of partitions is undefined after providing one or more values in the column that corresponds to the table partitioning key to the function for evaluation.

41. The non-transitory computer readable medium of claim 36, wherein the function executes over a superset of the table partitioning key.

42. The non-transitory computer readable medium of claim 36, wherein the table partitioning key comprises a date.

43. The non-transitory computer readable medium of claim 36, wherein executing the query over the partitioned table using the partition-wise execution comprises:
assigning different partitions of the plurality of partitions to different slave processes that execute the query over any assigned partitions.

44. The non-transitory computer readable medium of claim 36, wherein the first operation key and the second operation key comprise matching functions.

45. The non-transitory computer readable medium of claim 36, wherein the function extracts and returns a portion of a specified field in the column corresponding to the table partitioning key.

46. The non-transitory computer readable medium of claim 42, wherein at least some of the plurality of partitions do not correspond to an equal time span.

* * * * *